US012200634B2

(12) United States Patent
Sridharan et al.

(10) Patent No.: US 12,200,634 B2
(45) Date of Patent: Jan. 14, 2025

(54) TECHNIQUES FOR UPLINK TRANSMISSION POWER SPLITTING

(71) Applicant: QUALCOMM Incorporated, San Diego, CA (US)

(72) Inventors: Gokul Sridharan, Sunnyvale, CA (US); Kazuki Takeda, Tokyo (JP); Peter Gaal, San Diego, CA (US); Muhammad Sayed Khairy Abdelghaffar, San Jose, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 345 days.

(21) Appl. No.: 17/668,903

(22) Filed: Feb. 10, 2022

(65) Prior Publication Data

US 2023/0254781 A1 Aug. 10, 2023

(51) Int. Cl.

| | |
|---|---|
| ***H04B 1/38*** | (2015.01) |
| ***H04B 1/3827*** | (2015.01) |
| ***H04L 5/00*** | (2006.01) |
| ***H04W 52/14*** | (2009.01) |
| ***H04W 52/34*** | (2009.01) |

(52) U.S. Cl.

CPC .......... *H04W 52/34* (2013.01); *H04B 1/3838* (2013.01); *H04L 5/0048* (2013.01); *H04W 52/146* (2013.01)

(58) Field of Classification Search

None

See application file for complete search history.

(56) References Cited

U.S. PATENT DOCUMENTS

| | | | | |
|---|---|---|---|---|
| 11,653,275 | B2 * | 5/2023 | Bae | H04L 5/0023 370/331 |
| 2017/0013565 | A1 * | 1/2017 | Pelletier | H04W 72/0473 |
| 2020/0037328 | A1 * | 1/2020 | Sridharan | H04W 52/246 |
| 2021/0058871 | A1 * | 2/2021 | Ryu | H04W 52/325 |
| 2021/0258885 | A1 * | 8/2021 | Takeda | H04W 52/146 |
| 2021/0337427 | A1 * | 10/2021 | Takeda | H04W 72/23 |
| 2023/0180222 | A1 * | 6/2023 | Takeda | H04W 24/10 370/329 |
| 2024/0031951 | A1 * | 1/2024 | Lin | H04W 52/242 |

FOREIGN PATENT DOCUMENTS

| | | | | |
|---|---|---|---|---|
| EP | 3886351 | A1 * | 9/2021 | H04B 7/0404 |
| WO | WO-2022242822 | A1 * | 11/2022 | H04W 52/346 |

* cited by examiner

*Primary Examiner* — Pablo N Tran

(74) *Attorney, Agent, or Firm* — Holland & Hart LLP

(57) ABSTRACT

Methods, systems, and devices for wireless communications are described. A user equipment (UE) may select an uplink transmission power sharing configuration to use for transmission of one or more uplink messages. The uplink transmission power sharing configuration may be based on a first uplink transmission power capability of a first radio frequency (RF) chain of the UE and on a second uplink transmission power capability of a second RF chain of the UE. The UE may transmit the one or more uplink messages to a network entity in accordance with the uplink transmission power sharing configuration. Specifically, the UE may transmit the one or more uplink messages via the first RF chain using a first transmission power, and may transmit the one or more uplink messages via the second RF chain using a second transmission power that is different from the first transmission power.

21 Claims, 18 Drawing Sheets

300

| | PA1 [dBm] | PA2 [dBm] | |
|---|---|---|---|
| 410 | 26 | 23 | |
| | 25 | 23 | |
| | 24 | 23 | |
| 405 | 23 | 23 | Threshold |
| | 22 | 22 | |
| | 21 | 21 | |
| | 20 | 20 | |
| | 19 | 19 | |
| | 18 | 18 | |
| | 17 | 17 | |
| | 16 | 16 | |
| | 15 | 15 | |

| PA1 [dBm] | PA2 [dBm] |
|---|---|
| 26 | 23 |
| 25 | 22 |
| 24 | 21 |
| 23 | 20 |
| 22 | 19 |
| 21 | 18 |
| 20 | 17 |
| 19 | 16 |
| 18 | 15 |
| 17 | 14 |
| 16 | 13 |
| 15 | 12 |
| 415 | 420 |

TECHNIQUES FOR UPLINK TRANSMISSION POWER SPLITTING

FIELD OF TECHNOLOGY

The present disclosure relates to wireless communications, including techniques for uplink transmission power splitting.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be equipped with multiple power amplifiers (PAs). Using multiple PAs simultaneously may enable the UE to attain relatively higher transmission powers. In some cases, PAs may have different transmission power capabilities. The UE, however, may be precluded from applying different transmission powers to different PAs, which may constrain the maximum transmission power of the UE.

SUMMARY

The described techniques relate to improved methods, systems, devices, and apparatuses that support uplink transmission power splitting. The described techniques provide for configuring a user equipment (UE) to perform unequal transmission power splitting across radio frequency (RF) chains. In accordance with aspects of the present disclosure, a UE may select an uplink transmission power sharing configuration to use for transmission of one or more uplink messages. The uplink transmission power sharing configuration may be based on a first uplink transmission power capability of a first RF chain of the UE and on a second, different uplink transmission power capability of a second RF chain of the UE. The UE may transmit the one or more uplink messages to a network entity in accordance with the uplink transmission power sharing configuration. For example, the UE may transmit the one or more uplink messages via the first RF chain using a first transmission power, and may transmit the one or more uplink messages via the second RF chain using a second transmission power that is different from the first transmission power. The techniques described herein may enable the UE to transmit the one or more uplink messages with a relatively higher transmission power gain, among other benefits.

A method for wireless communications at a UE is described. The method may include selecting an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain, and transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

An apparatus for wireless communications at a UE is described. The apparatus may include a processor, memory coupled with the processor, and instructions stored in the memory. The instructions may be executable by the processor to cause the apparatus to select an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain, and transmit the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

Another apparatus for wireless communications at a UE is described. The apparatus may include means for selecting an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain, and means for transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

A non-transitory computer-readable medium storing code for wireless communications at a UE is described. The code may include instructions executable by a processor to select an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain, and transmit the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

Some examples of the method, apparatuses, and non-transitory computer-readable medium described herein may further include operations, features, means, or instructions for receiving, from the network entity, control signaling indicating the uplink transmission power sharing configuration, where selecting the uplink transmission power sharing configuration for transmission of the one or more uplink messages is based on the control signaling.

Some examples of the method, apparatuses, and non-transitory computer-readable medium described herein may further include operations, features, means, or instructions for determining to use the uplink transmission power sharing configuration for transmission of the one or more uplink messages based on a transmission power of the first RF chain, or a transmission power of the second RF chain, or both satisfying a transmission power threshold, where selecting the uplink transmission power sharing configuration is based on the determination.

Some examples of the method, apparatuses, and non-transitory computer-readable medium described herein may further include operations, features, means, or instructions for receiving control signaling indicating the transmission power threshold, where selecting the uplink transmission power sharing configuration for transmission of the one or more uplink messages is based on the control signaling.

In some examples of the method, apparatuses, and non-transitory computer-readable medium described herein, the transmission power includes an average transmission power within a time interval or a requested transmission power for the one or more uplink messages.

In some examples of the method, apparatuses, and non-transitory computer-readable medium described herein, the transmission power threshold may be based on the first uplink transmission power capability of the first RF chain of the UE, or the second uplink transmission power capability of the second RF chain of the UE, or a specific absorption rate (SAR) threshold of the UE, or a maximum permissible exposure (MPE) threshold of the UE, or a combination thereof.

Some examples of the method, apparatuses, and non-transitory computer-readable medium described herein may further include operations, features, means, or instructions for determining the transmission power threshold based on a result of a proximity detection procedure, or a physical uplink shared channel (PUCCH) power control equation, or both.

Some examples of the method, apparatuses, and non-transitory computer-readable medium described herein may further include operations, features, means, or instructions for determining to use a default uplink transmission power sharing configuration for transmission of the one or more uplink messages based on comparing a transmission power of the first RF chain, or a transmission power of the second RF chain, or both to a transmission power threshold.

In some examples of the method, apparatuses, and non-transitory computer-readable medium described herein, transmitting the one or more uplink messages may include operations, features, means, or instructions for transmitting the one or more uplink messages to the network entity based on an uplink transmission power differential between the first RF chain of the UE and the second RF chain of the UE.

Some examples of the method, apparatuses, and non-transitory computer-readable medium described herein may further include operations, features, means, or instructions for transmitting, to the network entity, an indication of the uplink transmission power differential between the first RF chain of the UE and the second RF chain of the UE.

Some examples of the method, apparatuses, and non-transitory computer-readable medium described herein may further include operations, features, means, or instructions for receiving, from the network entity, an indication of the uplink transmission power differential between the first RF chain of the UE and the second RF chain of the UE.

Some examples of the method, apparatuses, and non-transitory computer-readable medium described herein may further include operations, features, means, or instructions for receiving, from the network entity, an indication of whether the uplink transmission power differential is applicable to sounding reference signal (SRS) transmissions from the UE, or PUCCH transmissions from the UE, or both.

Some examples of the method, apparatuses, and non-transitory computer-readable medium described herein may further include operations, features, means, or instructions for receiving control signaling configuring a single-port resource for transmission of the one or more uplink messages, and selecting a transmission precoding matrix based on the uplink transmission power differential, the transmission precoding matrix including a first value associated with a full transmission power for the first RF chain and a second value that is less than the first value, the second value associated with a transmission power for the second RF chain, where the one or more uplink messages are transmitted using the single-port resource and the transmission precoding matrix.

Some examples of the method, apparatuses, and non-transitory computer-readable medium described herein may further include operations, features, means, or instructions for receiving, from the network entity, a control message indicating the first value associated with the full transmission power for the first RF chain, or the second value associated with the transmission power for the second RF chain, or both.

Some examples of the method, apparatuses, and non-transitory computer-readable medium described herein may further include operations, features, means, or instructions for receiving control signaling configuring a set of resources for the one or more uplink messages and sounding two or more ports using the set of resources based on the uplink transmission power differential.

Some examples of the method, apparatuses, and non-transitory computer-readable medium described herein may further include operations, features, means, or instructions for determining, based on the uplink transmission power sharing configuration, a transmission precoding matrix to use for transmission of the one or more uplink messages.

Some examples of the method, apparatuses, and non-transitory computer-readable medium described herein may further include operations, features, means, or instructions for transmitting, to the network entity, a power headroom report (PHR) indicating the uplink transmission power sharing configuration selected by the UE.

Some examples of the method, apparatuses, and non-transitory computer-readable medium described herein may further include operations, features, means, or instructions for transmitting, to the network entity, uplink control information (UCI) indicating the uplink transmission power sharing configuration selected by the UE.

In some examples of the method, apparatuses, and non-transitory computer-readable medium described herein, transmitting the one or more uplink messages may include operations, features, means, or instructions for transmitting, via the first RF chain, the one or more uplink messages in a first RF spectrum band and transmitting, via the second RF chain, the one or more uplink messages in a second RF spectrum band that is different from the first RF spectrum band.

In some examples of the method, apparatuses, and non-transitory computer-readable medium described herein, the one or more uplink messages include PUCCH transmissions, or SRS transmissions, or both.

A method for wireless communications at a network entity is described. The method may include transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain, and receiving one or more uplink messages in accordance with the uplink transmission power sharing configuration, where the one or more uplink messages are received at a first transmission power and at a second transmission power that is different from the first transmission power.

An apparatus for wireless communications at a network entity is described. The apparatus may include a processor, memory coupled with the processor, and instructions stored in the memory. The instructions may be executable by the processor to cause the apparatus to transmit control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain, and receive one or more uplink messages in accordance with the uplink transmission power sharing configuration, where the one or more uplink messages are received at a first transmission power and at a second transmission power that is different from the first transmission power.

Another apparatus for wireless communications at a network entity is described. The apparatus may include means for transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain, and means for receiving one or more uplink messages in accordance with the uplink transmission power sharing configuration, where the one or more uplink messages are received at a first transmission power and at a second transmission power that is different from the first transmission power.

A non-transitory computer-readable medium storing code for wireless communications at a network entity is described. The code may include instructions executable by a processor to transmit control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain, and receive one or more uplink messages in accordance with the uplink transmission power sharing configuration, where the one or more uplink messages are received at a first transmission power and at a second transmission power that is different from the first transmission power.

In some examples of the method, apparatuses, and non-transitory computer-readable medium described herein, transmitting the control signaling may include operations, features, means, or instructions for transmitting the control signaling indicating the uplink transmission power sharing configuration, or a transmission power threshold associated with the uplink transmission power sharing configuration, or both, where receiving the one or more uplink messages from the UE is based on the control signaling.

In some examples of the method, apparatuses, and non-transitory computer-readable medium described herein, the transmission power threshold may be based on the first uplink transmission power capability of the first RF chain of the UE, or the second uplink transmission power capability of the second RF chain of the UE, or a SAR threshold of the UE, or an MPE threshold of the UE, or a combination thereof.

Some examples of the method, apparatuses, and non-transitory computer-readable medium described herein may further include operations, features, means, or instructions for receiving an indication of an uplink transmission power differential between the first RF chain of the UE and the second RF chain of the UE.

Some examples of the method, apparatuses, and non-transitory computer-readable medium described herein may further include operations, features, means, or instructions for transmitting an indication of whether the uplink transmission power differential is applicable to SRS transmissions, or PUCCH transmissions, or both.

Some examples of the method, apparatuses, and non-transitory computer-readable medium described herein may further include operations, features, means, or instructions for transmitting control signaling configuring a single-port resource for transmission of the one or more uplink messages, determining a transmission precoding matrix of the UE based on the uplink transmission power differential and on the single-port resource, the transmission precoding matrix including a first value associated with a full transmission power for the first RF chain of the UE and a second value that is less than the first value, the second value associated with a transmission power for the second RF chain of the UE, and decoding the one or more uplink messages using the transmission precoding matrix.

Some examples of the method, apparatuses, and non-transitory computer-readable medium described herein may further include operations, features, means, or instructions for transmitting control signaling configuring a set of resources for transmission of one or more SRSs, and receiving the one or more SRSs on the set of resources and based on the uplink transmission power differential.

Some examples of the method, apparatuses, and non-transitory computer-readable medium described herein may further include operations, features, means, or instructions for receiving a PHR, or UCI, or both, and determining that the UE is using the uplink transmission power sharing configuration based on the PHR, or the UCI, or both.

BRIEF DESCRIPTION OF THE DRAWINGS

FIGS. 4A and 4B illustrate examples of transmission power schemes that support techniques for uplink transmission power splitting in accordance with aspects of the present disclosure.

DETAILED DESCRIPTION

Figure 1:
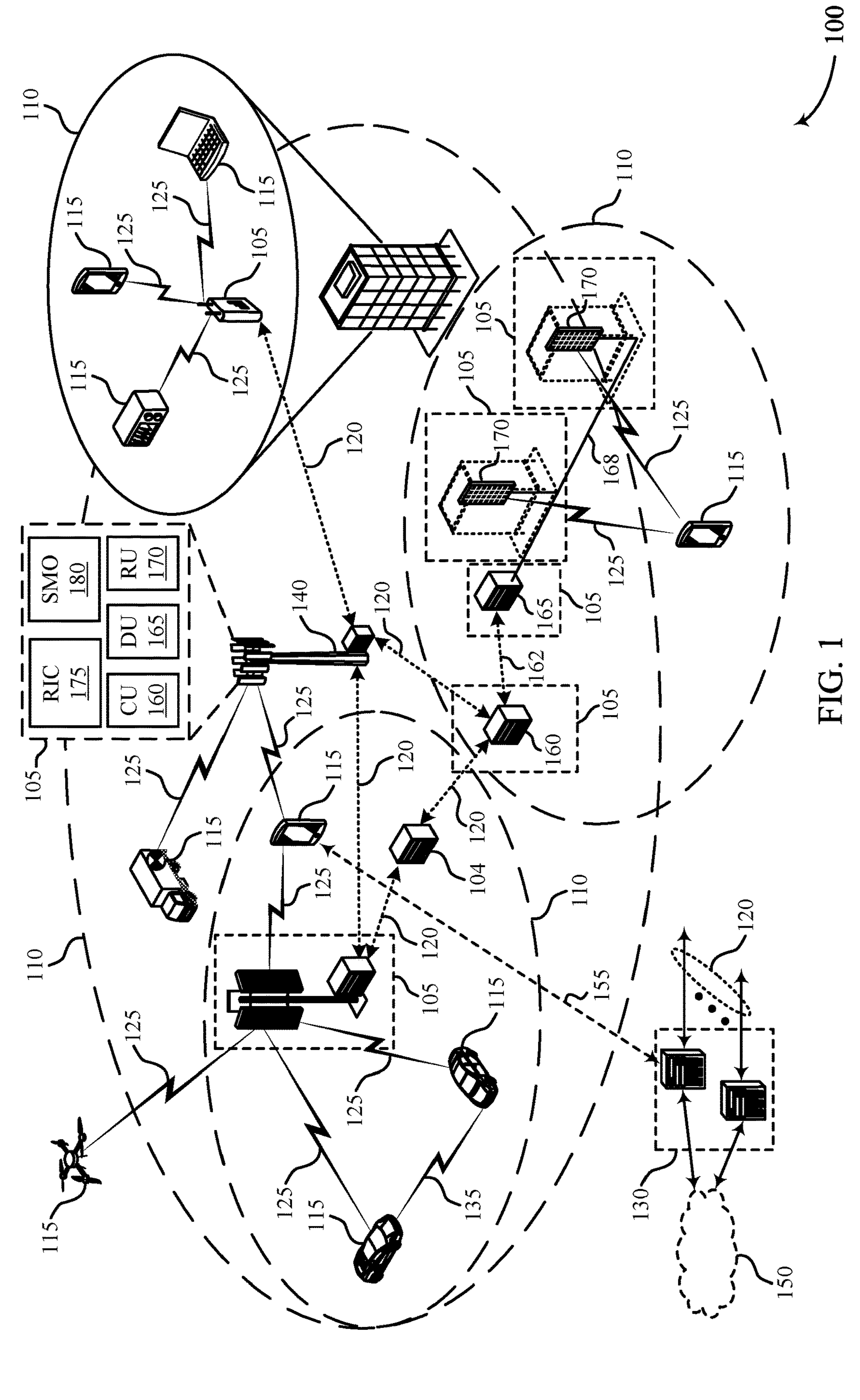
FIGS. 1 and 2 illustrate examples of wireless communications systems that support techniques for uplink transmission power splitting in accordance with aspects of the present disclosure.

A user equipment (UE) may be required to operate within specific absorption rate (SAR) and maximum permissible exposure (MPE) constraints that limit radio frequency (RF) exposure from transmissions by the UE. These constraints may prevent the UE from exceeding a specific transmission power for an extended period of time. In some examples, the UE may attain a relatively higher effective transmission power (e.g., without exceeding SAR and MPE constraints) by performing transmissions across different frequency bands using different RF chains (also referred to herein as transmit chains). Using a full transmission power across multiple RF chains may enhance the reliability of transmissions from the UE.

In some cases, the UE may be equipped with RF chains that are associated with different transmission power capabilities. For example, a first RF chain of the UE may be associated with a first maximum transmission power (e.g., 26 decibel milliwatts (dBm)), while a second RF chain of the UE may be associated with a second, different maximum transmission power (e.g., 23 dBm). In some cases, however, the UE may be precluded from using different transmission powers for respective RF chains with different transmission power capabilities. That is, the UE may be constrained to using the same transmission power across both RF chains, which may limit the transmission power gain associated with using the maximum transmission power available to respective RF chains.

Aspects of the present disclosure may enable a UE to perform unequal transmission power splitting across different RF chains. For example, if the UE has a first RF chain with a maximum transmission power of 26 dBm and a second RF chain with a maximum transmission power of 23 dBm, the techniques described herein may enable the UE to use a relatively higher transmission power for the first RF chain (e.g., in comparison to the second RF chain), thereby enabling the UE to attain a higher overall transmission power (e.g., in comparison to equal transmission power splitting schemes). In particular, the UE may be configured with an uplink transmission power sharing configuration that defines different respective transmission powers for the first and second RF chains.

In some examples, the UE may be configured to perform unequal transmission power splitting across the first and second RF chains after a transmission power threshold of the UE (e.g., the maximum transmission power of the second RF chain) has been exceeded. In other examples, the UE may be configured with a fixed transmission power differential between the first and second RF chains, and the UE may perform unequal transmission power splitting based on this fixed transmission power differential. For example, if the maximum transmission power of the first RF chain is 3 dBm higher than the maximum transmission power of the second RF chain, the UE may apply a fixed transmission power differential of 3 dBm across the first and second RF chains, such that transmissions from the first RF chain are 3 dBm higher than transmissions from the second RF chain.

Aspects of the present disclosure may be implemented to realize one or more of the following advantages. The described techniques may enable a UE to attain a relatively higher transmission power gain by performing unequal transmission power splitting across RF chains with different transmission power capabilities. For example, if a first RF chain of the UE has a higher transmission power capability (e.g., maximum transmission power) than a second RF chain of the UE, the techniques described herein may enable the UE to use a higher transmission power for the first RF chain (e.g., higher than the maximum transmission power of the second RF chain), which may increase the maximum attainable transmission power gain of the UE. Increasing the maximum attainable transmission power gain of the UE may improve the reliability of uplink transmissions from the UE, among other benefits.

Aspects of the disclosure are initially described in the context of wireless communications systems, transmission power graphs, transmission power schemes, port configurations, and process flows. Aspects of the disclosure are further illustrated by and described with reference to apparatus diagrams, system diagrams, and flowcharts that relate to techniques for uplink transmission power splitting.

FIG. 1 illustrates an example of a wireless communications system 100 that supports techniques for uplink transmission power splitting in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In some examples, network entities 105 and UEs 115 may wirelessly communicate via one or more communication links 125. For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an access point, a radio transceiver, a NodeB, an eNodeB (eNB), a next-generation NodeB or a giga-NodeB (either of which may be referred to as a gNB), a next-generation eNB (ng-eNB), a Home NodeB, a Home eNodeB, or other suitable terminology). A network entity 105 (e.g., a base station 140) may be implemented in an aggregated or monolithic base station architecture, or alternatively, in a disaggregated base station architecture. For example, a network entity 105 may include one or more of a central unit (CU) 160, a distributed unit (DU) 165, a radio unit (RU) 170, a Radio Access Network (RAN) Intelligent Controller (MC) 175 (e.g., a Near-Real Time MC (Near-RT MC), a Non-Real Time MC (Non-RT MC), a Service Management and Orchestration (SMO) 180 system, or any combination thereof. An RU 170 may also be referred to as a radio head, a smart radio head, a remote radio head (RRH), a remote radio unit (RRU), or a transmission/reception point (TRP). One or more components of the network entities 105 of a disaggregated RAN may be co-located, or one or more components of the network entities 105 may be located in distributed locations.

The split of functionality between a CU 160, a DU 165, and an RU 170 is flexible and may support different functionalities depending upon which functions (e.g., network layer functions, protocol layer functions, baseband functions, radio frequency functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an integrated access backhaul (IAB) network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 (e.g., one or more RUs 170) may be partially controlled by CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for uplink transmission power splitting as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

A carrier may be associated with a particular bandwidth of the radio frequency spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of a radio frequency spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed radio frequency spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some examples, transmissions by a device (e.g., by a network entity 105 or a UE 115) may be performed using multiple beam directions, and the device may use a combination of digital precoding or radio frequency beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

Some wireless communications systems may support techniques for downlink carrier aggregation. However, in some cases, these wireless communications systems may not support techniques for uplink carrier aggregation, and relatively higher UE transmission powers may be desirable for uplink communications. In some examples, a UE 115 may be unable to efficiently use more than a fraction of a total bandwidth of a single component carrier (CC) in a relatively large portion of a geographic coverage area 110. Thus, aggregating uplink CCs may provide nominal improvements to UE transmission power. Each RF spectrum band that a UE 115 supports may increase the attainable transmission power of the UE 115, and using uplink dynamic power aggregation techniques (also referred to herein as dynamic power management) may enable UEs 115 to attain relatively higher transmission powers. Specifically, dynamic uplink power aggregation may enable UEs 115 to use a total available short-term peak power. The UE 115 may implement long-term (e.g., 30 second) duty cycle control to maintain SAR compliance. Dynamic uplink power aggregation may provide relatively higher peak data rates and increased uplink throughput levels, among other benefits.

Additionally, or alternatively, some wireless communications systems may support techniques for uplink MIMO communications and non-MIMO communications. For uplink MIMO, for example, a UE 115 may have multiple power amplifiers (PAs) that are capable of transmitting at full power. Using these PAs simultaneously may enable the UE 115 to attain higher uplink transmission powers. Uplink MIMO communication systems may employ at least SAR or MPE-based antenna grouping, or SAR or MPE reporting per transmission PMI (TPMI), or full-power scaling for dynamic power aggregation, or unequal power splitting for physical uplink shared channel (PUSCH) and sounding reference signals (SRSs), or a combination thereof. In contrast, non-MIMO communication schemes may leverage waveform shaping techniques to enable a UE 115 to use transmission powers that are above a rated power class of the UE 115. Some modulation and coding schemes (MCSs) such as π/2 binary phase shift keying (BPSK) may also enable a UE 115 to transmit above a rated power class of the UE. Expanding this functionality to other MCSs using waveform-shaping techniques may reduce the bandwidth that is available for such transmissions.

Some wireless communications systems may comply with constraints and regulations that limit RF exposure from UEs 115. RF exposure compliance may include SAR compliance and MPE compliance. For RF spectrum bands below 6 GHz, SAR may be used as a metric for RF exposure. SAR may be measured in Watts per kg or Watts per $cm^3$ and may indicate the power absorbed by a specific volume of tissue. Similarly, MPE is used to regulate exposure concerns with mmW bands, as communications within these RF spectrum bands can heat human tissue. The metric for MPE is power density, which may be measured in Watts per $cm^2$. SAR and MPE (e.g., power density) compliance may be jointly utilized to limit RF exposure from UEs 115. The sum of normalized SAR exposure and normalized MPE exposure may be calculated using Equation 1.

$$\sum_{i=100\ kHz}^{10\ GHz} \frac{SAR_i}{SAR_{lim}} + \sum_{10\ GHz}^{300\ GHz} \frac{PD_i}{PD_{lim}} \leq 1 \quad (1)$$

Some techniques for MPE compliance may involve proximity detection (e.g., determining the proximity of human tissue with respect to a UE 115). Some UEs 115 may employ a framework of sensors and algorithms to perform proximity detection. The results may be quantized and reported as a detection result index (DRI). As an example, a DRI value of 0 may indicate that human tissue is in direct contact with a surface of the UE 115. When DRI is 0, the equivalent isotropically radiated power (EIRP) may be limited to, for example, below 8 dBm. That is, 8 dBm may represent the maximum permitted EIRP of a UE 115 when the distance between human tissue and a surface of the UE 115 is 0. EIRP may be calculated using the equation $EIRP=PD*4*\pi*R^2$, where PD denotes a power density (in Watts per $cm^2$) and R denotes a distance from the UE 115. As DRI (e.g., the distance between the UE 115 and human tissue) increases from 10 mm to 140 mm, the permitted EIRP may increase to 34 dBm. Thus, DRI may be used to determine how much power density exposure is permitted for a UE 115.

Some wireless communications systems may support multiple uplink MIMO configurations for UEs 115. For example, a first UE 115 having some power class (e.g., UE A, which may be an example of a power class 2 (PC2) device) may be equipped with two transmit chains that are powered by two PAs, each of which may have a transmission power capability (e.g., maximum transmission power, such as 26 dBm). A second PC2 UE 115 (e.g., UE B) may be equipped with two transmit chains that are powered by first PA (e.g., a PA with a transmission power capability of 26 dBm) and second PA (e.g., a PA with a transmission power capability of 23 dBm). Both UEs 115 (e.g., UE A and UE B) may benefit from implementing some form of dynamic transmission power control. As an illustrative example, UE A may deliver up to 29 dBm when configured to use a [1 1] precoder. Similarly, UE B may deliver up to 27.7 dBm when configured to use a [1 1] precoder. Aspects of the present disclosure may support power allocation and splitting procedures for UEs 115, such as UE B (e.g., a UE 115 with a 26 dBm PA and a 23 dBm PA). However, it is to be understood that the techniques and operations described herein may also be applicable to other UEs 115.

In some wireless communications systems, scale factors may be used for codebook-based PUSCH transmissions. If, for example, an uplink full-power transmission parameter (e.g., ul-FullPowerTransmission) in a PUSCH configuration (e.g., PUSCH-Config) is provided, a UE 115 may scale a PUSCH transmission power by a scaling factor s. If the uplink full-power transmission parameter in the PUSCH configuration is set to a first value (e.g., fullpowerMode1) and each SRS resource in an SRS resource allocation (e.g., SRS-ResourceSet with usage set to 'codebook') has more than one SRS port, the scaling factor s may be the ratio of a number of antenna ports (also referred to herein as RF chains or transmit chains) with non-zero PUSCH transmission power over the maximum number of SRS ports (e.g., antenna ports configured for SRS transmissions) supported by the UE 115 in one SRS resource.

Alternatively, if the uplink full-power transmission parameter in the PUSCH configuration is set to a second value (e.g., fullpowerMode2), the scaling factor s may be 1 for full-power TPMIs reported by the UE 115, and may be the ratio of a number of antenna ports with non-zero PUSCH transmission power over a number of SRS ports for remaining TPMIs, where the number of SRS ports is associated with an SRS resource indicated by an SRS resource indicator (SRI) field in a downlink control information (DCI) format scheduling the PUSCH transmission if more than one SRS resource is configured in the SRS resource allocation or if more than one SRS resource is indicated by a Type-1 configured grant, or if the number of SRS ports is associated with the SRS resource (e.g., if only one SRS resource is configured in the SRS resource allocation).

In other cases, the scaling factor s may be set to 1 if an SRS resource with a single port is indicated by an SRI field in a DCI format scheduling the PUSCH transmission when more than one SRS resource is provided in the SRS resource allocation (e.g., SRS-ResourceSet with usage set to 'codebook'), or if more than one SRS resource is indicated by a Type-1 configured grant, or if only one SRS resource with a single port is provided in the SRS resource allocation. Alternatively, if the uplink full-power transmission parameter in the PUSCH configuration is set to a third value (e.g., fullPower), the scaling factor s may be set to 1. Otherwise, if each SRS resource in the SRS resource allocation has more than one SRS port, the UE 115 may scale a linear value by the ratio of the number of antenna ports with a non-zero PUSCH transmission power to the maximum number of SRS ports supported by the UE 115 in one SRS resource. In such cases, the UE may split transmission power equally across the antenna ports used for PUSCH transmissions with non-zero power.

In some cases, UEs 115 with multiple PAs having similar capabilities (e.g., two 26 dBm PAs) may declare support for mode 0 via a first IE (e.g., fullPower) in a PUSCH configuration. For dynamic power management, such UEs 115 may be classified within some power class (e.g., a 29 dBm power class), and may indicate support for mode 1 or mode 2 via a second IE (e.g., ul-FullPowerTransmission-r16). The target uplink power of these UEs 115 may reflect the total desired transmission power. Some TPMIs may not support full power transmissions, while other TPMIs (e.g., [1 1]) may be capable of supporting full power transmissions. For SRS transmissions, power control may be implemented in a similar manner, where the target uplink power of a UE 115 reflects the total desired transmission power. For SRS transmissions, the target transmission power may be divided equally across all ports within an SRS resource.

Likewise, UEs 115 with different PAs having different capabilities (e.g., one 26 dBm PA and one 23 dBm PA) may declare support for mode 1 or mode 2 via one or more IEs in a PUSCH configuration. If such UEs 115 support mode 2, a specific TPMI (e.g., [1 0]) may be capable of supporting full power transmissions. For dynamic power management, such UEs 115 may be classified within some power class (e.g., a 27.7 dBm power class). Existing transmission modes, however, may not support unequal distribution of transmission powers across different antenna ports. That is, unequal power splitting may enable these UEs 115 to attain relatively higher transmission powers, but existing TPMIs may not be capable of supporting full power transmissions from such UEs 115. For example, a [1 1] precoder may involve equal transmission power splitting across both antenna ports. If classified, for example, within the 27.7 dBm power class, these UEs 115 may be unable to utilize equal transmission power splitting at maximum transmission power levels. Aspects of the present disclosure may enable such UEs 115 (e.g., UEs 115 equipped with PAs that have different transmission power capabilities) to perform unequal power splitting by classifying these UEs 115 within a different power class (e.g., separate from the 27.7 dBm power class).

As described herein, the wireless communications system 100 may support techniques for unequal transmission power sharing at a UE 115 with heterogeneous PA transmission power capabilities, which may enable the UE 115 to attain relatively higher transmission power levels (without exceeding SAR or MPE constraints of the UE 115). For example, if a first PA of the UE 115 has a higher uplink transmission power capability (e.g., maximum uplink transmission power) than a second PA of the UE 115, the UE 115 may use a higher transmission power for the first PA (e.g., in comparison to a transmission power of the second PA), which may enable the UE 115 to attain a higher overall transmission power (e.g., in comparison to equal transmission power splitting schemes). Increasing the effective transmission power of uplink communications from the UE 115 may improve the reliability of such communications, and may enable the UE 115 to attain relatively higher throughput levels, among other benefits.

Figure 2:
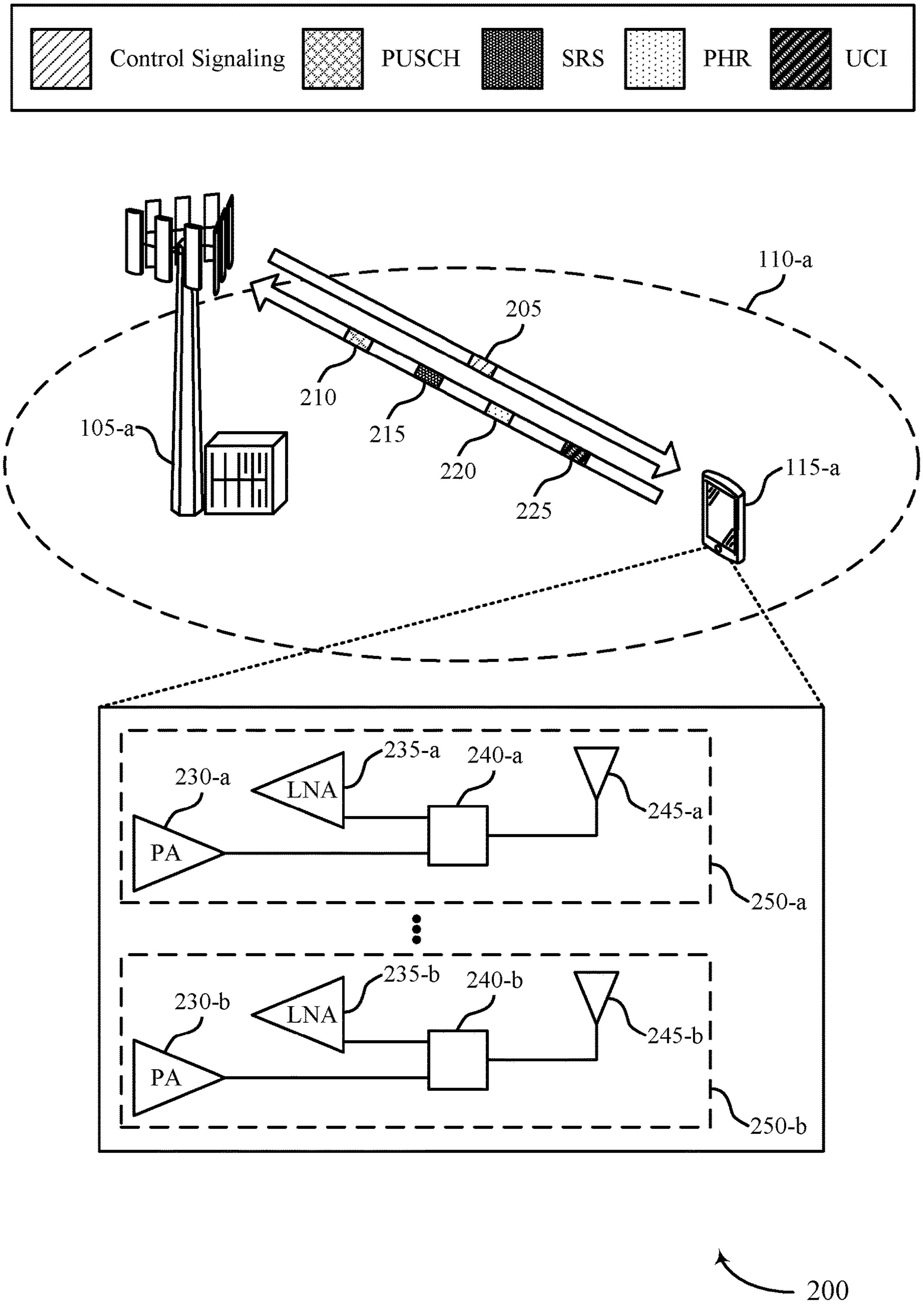

FIG. 2 illustrates an example of a wireless communications system 200 that supports techniques for uplink transmission power splitting in accordance with aspects of the present disclosure. The wireless communications system 200 may implement or be implemented by aspects of wireless communications system 100. For example, the wireless communications system 200 may include a UE 115-*a* and a network entity 105-*a* (e.g., a network entity), which may be examples of corresponding devices described with reference to FIG. 1. The UE 115-*a* and the network entity 105-*a* may communicate within a coverage area 110-*a*, which may be an example of a coverage area 110 described with reference to FIG. 1. In the wireless communications system 200, the UE 115-*a* may use an unequal transmission power sharing configuration for transmission of one or more uplink messages to the network entity 105-*a*.

In the example of FIG. 2, the UE 115-*a* may be equipped with an RF chain 250-*a* and an RF chain 250-*b*. The RF chain 250-*a* may include a PA 230-*a*, a low noise amplifier (LNA) 235-*a*, a filter 240-*a*, and an antenna 245-*a*. Likewise, the RF chain 250-*b* may include a PA 230-*b*, an LNA 235-*b*, a filter 240-*b*, and an antenna 245-*b*. Although illustrated with two RF chains 250, it is to be understood that the UE 115-*a* may be equipped with any number of RF chains 250 that include various electronic components. The filters 240 may be examples of low pass filters (LPF), band pass filters (BPF), or other filters connected to or otherwise coupled with the antennas 245.

In some examples, the PAs 230 may have different transmission power capabilities. For example, the PA 230-*a* may have a transmission power capability (e.g., maximum transmission power) of 26 dBm, whereas the PA 230-*b* may have a transmission power capability of 23 dBm. In some examples, the UE 115-*a* may attain a relatively higher overall transmission power by using both of the PAs 230 simultaneously. However, existing transmission schemes may preclude the UE 115-*a* from using different transmission powers for the PAs 230, which may prevent the UE 115-*a* from utilizing the full transmission power capabilities of the PAs 230.

In accordance with aspects of the present disclosure, the UE 115-*a* may be configured to perform unequal transmission power sharing across the PAs 230, which may enable the UE 115-*a* to increase the overall transmission power gain of uplink transmissions from the UE 115-*a*. In particular, the UE 115-*a* may be configured with an unequal transmission power sharing configuration that defines a set of rules for allocating transmission power to the PAs 230. In some examples, the network entity 105-*a* may configure the UE 115-*a* with the unequal transmission power sharing configuration via control signaling 205. The control signaling 205 may include at least an RRC message, or a system information message, or an instance of DCI, or a MAC-CE, or a combination thereof. In other examples, the UE 115-*a* may be preconfigured with the unequal transmission power sharing configuration.

In some examples, the UE 115-*a* may be configured to operate in an unequal power splitting mode after a transmission power threshold is satisfied. For example, the UE 115-*a* may operate in an equal transmission power splitting mode (e.g., Mode A) until a specific transmission power threshold is satisfied. This transmission power threshold may be based on a PUSCH power control equation, or a result of a proximity detection procedure (as described with reference to FIG. 1), or both. The UE 115-*a* may switch to an unequal transmission power splitting mode (e.g., Mode B) once a target or desired transmission power of the UE 115-*a* exceeds the transmission power threshold. While operating in Mode B, the UE 115-*a* may allocate a first transmission power (e.g., X dBm) across both PAs 230, and may then add a second transmission power (e.g., Y dBm) to the PA 230-*a* (e.g., the PA with the higher maximum transmission power). If Z dBm is the target transmission power of the UE 115-*a*, the relationship between the target transmission power, the first transmission power, and the second transmission power may be defined by the equation $Z_{lin}=2X_{lin}+Y_{lin}$.

In some examples, the UE 115-*a* may indicate the operating mode of the UE 115-*a* (e.g., Mode A or Mode B) in a power headroom report (PHR) or an instance of uplink control information (UCI). For example, the UE 115-*a* may include an indication of the operating mode of the UE 115-*a* in a PHR 220 or UCI 225, which may be multiplexed with a PUSCH transmission. Alternatively, the network entity 105-*a* may infer the operating mode of the UE 115-*a* based on the PHR 220 from the UE 115-*a*. In some examples, the transmission power threshold may be dynamic (e.g., not a fixed value). For example, if the UE 115-*a* transmits waveforms with different maximum power reduction (MPR) values, the UE 115-*a* may be unable to transmit a waveform at 26 dBm (from the PA 230-*a*) and at 21 dBm (from the PA 230-*b*). In such examples, the UE 115-*a* may dynamically set the transmission power threshold to 23−X, where X denotes an MPR value (e.g., in dB) for a waveform.

In other examples, the UE 115-*a* may autonomously split transmission power across the RF chains 250 based on a transmission power differential (e.g., a fixed transmission power differential). The UE 115-*a* may indicate the transmission power differential to the network entity 105-*a*. In other examples, the UE 115-*a* may not indicate the transmission power differential to the network entity 105-*a*. The transmission power differential may be applicable to all transmission power combinations (e.g., the fixed transmission power differential may not be specific to a transmission power level or threshold). The fixed transmission power differential may be applicable to both SRS transmissions 215 and PUSCH transmissions 210, which may ensure integrity between the SRS transmissions 215 and the PUSCH transmissions 210. Receiving an indication of the transmission power differential from the UE 115-*a* may enable the network entity 105-*a* to determine (e.g., infer) underlying channel characteristics for each port. These characteristics may assist the network entity 105-*a* with port and TPMI selection.

In some examples, an indication of whether to perform unequal transmission power splitting may be included in an SRS configuration. If unequal transmission power splitting is supported for the SRS transmissions 215, the network entity 105-*a* may receive the SRS transmissions 215 (e.g., from SRS ports of the UE 115-*a*) at different power levels. A precoder (e.g., a [1 1] precoder) may be applicable to such power splitting schemes, and may be used for uplink transmissions from the UE 115-*a* (provided that the PUSCH transmissions 210 from the UE 115-*a* align with an SRS transmission power splitting mode of the UE 115-*a*). In some examples, the UE 115-*a* may perform the PUSCH transmissions 210 and the SRS transmissions 215 using the same power splitting mode and relatively coupled PUSCH power control loops. In other examples, the network entity 105-*a* may indicate (e.g., to the UE 115-*a*) that an SRS power differential (e.g., for the SRS transmissions 215) is also applicable to the PUSCH transmissions 210. That is, the network entity 105-*a* may override a PUSCH power splitting mode of the UE 115-*a*.

The wireless communications system 200 may support techniques for unequal transmission power sharing at the UE 115-*a* (e.g., a UE 115 with heterogeneous PA capabilities), which may enable the UE 115-*a* to attain relatively higher transmission power levels without exceeding SAR or MPE constraints of the UE 115-*a*. For example, if the PA 230-*a* (e.g., a first PA of the UE 115-*a*) has a higher uplink transmission power capability (e.g., maximum uplink transmission power) than the PA 230-*b* (e.g., a second PA of the UE 115-*a*), the UE 115-*a* may use a higher transmission power for the PA 230-*a* (e.g., in comparison to a transmission power of the PA 230-*b*), which may enable the UE 115-*a* to attain a higher overall transmission power (e.g., in comparison to equal transmission power splitting schemes). Increasing the effective transmission power of uplink communications from the UE 115-*a* may improve the reliability of such communications and may enable the UE 115-*a* to attain relatively higher throughput levels, among other benefits.

Figure 3:
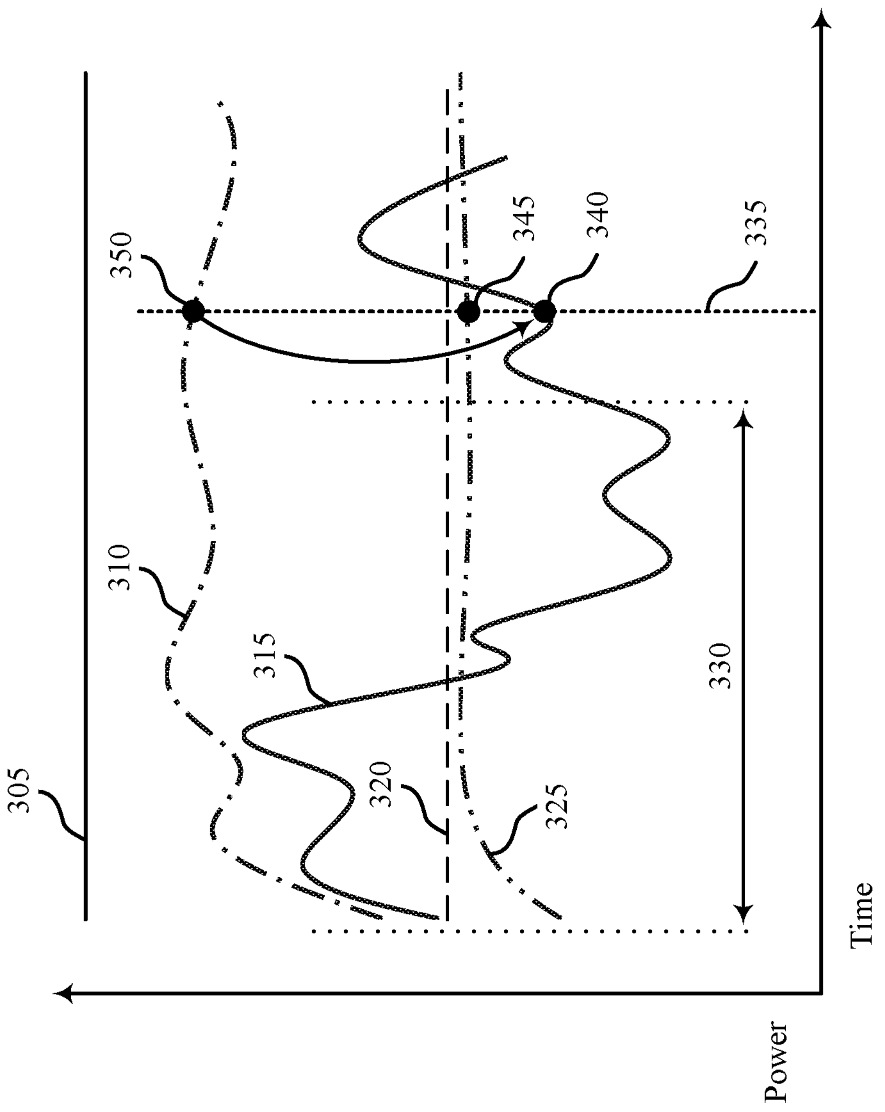
FIG. 3 illustrates an example of a transmission power graph that supports techniques for uplink transmission power splitting in accordance with aspects of the present disclosure.

FIG. 3 illustrates an example of a transmission power graph 300 that supports techniques for uplink transmission power splitting in accordance with aspects of the present disclosure. The transmission power graph 300 may implement or be implemented by aspects of the wireless communications system 100 or the wireless communications system 200. For example, the transmission power graph 300 may illustrate various transmission power levels of a UE, which may be an example of a UE 115 described with reference to FIGS. 1 and 2. More specifically, the transmission power graph 300 may illustrate a requested transmission power curve 310, an instantaneous transmission power curve 315, an average transmission power curve 325, and an average transmission power threshold 320.

As described with reference to FIGS. 1 and 2, the techniques described herein may enable a UE to perform unequal transmission power splitting across different RF chains. For example, if the UE has a first RF chain with a maximum transmission power of 26 dBm and a second RF chain with a maximum transmission power of 23 dBm, the described techniques may enable the UE to use a higher transmission power for the first RF chain (e.g., in comparison to the second RF chain), thereby enabling the UE to attain a higher overall transmission power (e.g., in comparison to applying the same transmission power to both RF chains). In particular, the UE may be configured with an uplink transmission power sharing configuration that defines different respective transmission powers for the first and second RF chains.

In some examples, the UE may be configured to perform unequal transmission power splitting across the first and second RF chains after a transmission power threshold of the UE (e.g., the maximum transmission power of the second RF chain) has been exceeded. In other examples, the UE may be configured with a fixed transmission power differential between the first and second RF chains, and may perform unequal transmission power splitting based on this fixed transmission power differential. For example, if the maximum transmission power of the first RF chain is 3 dBm higher than the maximum transmission power of the second RF chain, the UE may apply a fixed transmission power differential of 3 dBm across the first and second RF chains, such that transmissions from the first RF chain are 3 dBm higher than transmissions from the second RF chain.

In the example of FIG. 3, an average transmission power 345 of a UE at a time 335 (e.g., $P_{ave}$ (t)) may be obtained by taking an average of the instantaneous transmission power curve 315 (e.g., $P_{inst}$(t')) within a time window 330 (e.g., t−W−D<t'≤t−D), where W is the size or duration of the time window 330 and D is the gap between the end of the time window 330 and the time 335. In some cases, D can be equal to 0. The UE may set an instantaneous transmission power 340 at the time 335 (e.g., $P_{inst}$(t)) such that the average transmission power 345 at the time 335 (e.g., $P_{ave}$ (t)) is less than the average transmission power threshold 320 (e.g., $P_{ave,max}$).

The UE may set the instantaneous transmission power 340 at the time 335 (e.g., $P_{inst}$(t)) such that the instantaneous transmission power 340 is scaled down from a requested transmission power 350 at the time 335 (e.g., $P_{req}$(t)). A hardware limit 305 of the UE may correspond to a maximum PA transmission power capability of the UE (e.g., 26 dBm, 28 dBm). If the average transmission power threshold 320 (e.g., $P_{ave,lim}$) is set to 23 dBm, the UE may be in compliance with SAR regulations and MPE constraints. If the average transmission power threshold 320 (e.g., $P_{ave,lim}$) is less than 23 dBm, additional transmission power adjustments (or uplink duty cycle modifications) may be utilized in conjunction with dynamic power aggregation techniques.

The transmission power graph 300 may support techniques for unequal transmission power sharing at a UE with heterogeneous PA capabilities, which may enable the UE to attain relatively higher transmission power levels without exceeding SAR or MPE constraints of the UE. For example, if a first PA of the UE has a relatively higher uplink transmission power capability (e.g., maximum uplink transmission power) than a second PA of the UE, the UE may use a higher transmission power for the first PA (e.g., in comparison to a transmission power of the second PA), which may enable the UE to attain a relatively higher overall transmission power (e.g., in comparison to equal transmission power splitting schemes). Increasing the effective transmission power of uplink communications from the UE may improve the reliability of such communications, which may enable the UE to attain relatively higher throughput levels, among other benefits.

FIGS. 4A and 4B illustrate examples of a transmission power scheme 400 and a transmission power scheme 401, respectively, that support techniques for uplink transmission power splitting in accordance with aspects of the present disclosure. The transmission power scheme 400 and the transmission power scheme 401 may implement or be implemented by aspects of the wireless communications system 100 or the wireless communications system 200. For example, the transmission power scheme 400 or the transmission power scheme 401 may be implemented by a UE, which may be an example of a UE 115 described with reference to FIGS. 1 and 2. The transmission power scheme 400 may illustrate an example of an unequal transmission power sharing configuration that is based on a transmission power threshold, whereas the transmission power scheme 401 may illustrate an example of an unequal transmission power sharing configuration that is based on a transmission power differential.

As described with reference to FIGS. 1 through 3, the techniques described herein may enable a UE to perform unequal transmission power splitting across different RF chains. For example, if the UE has a first RF chain with a maximum transmission power of 26 dBm and a second RF chain with a maximum transmission power of 23 dBm, the described techniques may enable the UE to use a higher transmission power for the first RF chain (e.g., in comparison to the second RF chain), thereby enabling the UE to attain a higher overall transmission power (e.g., in comparison to applying the same transmission power to both RF chains). Specifically, the UE may be configured with an uplink transmission power sharing configuration that defines different respective transmission powers for the first and second RF chains.

In some examples, the UE may be configured to perform unequal transmission power splitting across the first and second RF chains after a transmission power threshold of the UE (e.g., the maximum transmission power of the second RF chain) has been exceeded. In other examples, the UE may be configured with a fixed transmission power differential between the first and second RF chains, and the UE may perform unequal transmission power splitting based on this fixed transmission power differential. For example, if the maximum transmission power of the first RF chain is 3 dBm higher than the maximum transmission power of the second RF chain, the UE may apply a fixed transmission power differential of 3 dBm across the first and second RF chains, such that transmissions from the first RF chain are 3 dBm higher than transmissions from the second RF chain.

In the example of FIG. 4A, the UE may be configured to perform unequal transmission power splitting across the first and second RF chains after a transmission power threshold of the UE (e.g., the maximum transmission power of the second RF chain) has been exceeded. For example, if the maximum transmission power of the second RF chain is 23 dBm, the UE may be configured to perform unequal transmission power splitting for requested transmission powers above 23 dBm. For transmission powers 405 below this transmission power threshold, the UE may operate in an equal transmission power sharing mode (e.g., Mode A). That is, the UE may apply the same transmission power to both RF chains. For transmission powers 410 above this transmission power threshold, the UE may switch to an unequal transmission power sharing mode (e.g., Mode B), which may involve applying different transmission powers to the first and second RF chains. For example, the UE may apply a transmission power of 26 dBm to the first RF chain, and may apply a transmission power of 23 dBm to the second RF chain. It is noted that a value of the transmission power threshold described herein should not be considered limiting to the claims or the disclosure, and while the examples provided by FIG. 4A describes transmission power threshold of 23 dBm, the threshold may have a value that is different than 23 dBm.

In the example of FIG. 4B, the UE may be configured with a fixed transmission power differential between the first and second RF chains, and may perform unequal transmission power splitting based on this fixed transmission power differential. For example, if the maximum transmission power of the first RF chain is 26 dBm and the maximum transmission power of the second RF chain is 23 dBm (e.g., if the maximum transmission power of the first RF chain is 3 dBm higher than the maximum transmission power of the second RF chain), the UE may be configured with a transmission power differential of 3 dBm. Thus, transmission powers 415 for the first RF chain may be 3 dBm higher than transmission powers 420 for the second RF chain. The transmission power differential may have other values that are different than the 3 dBm differential described in the example of FIG. 4B.

The transmission power scheme 400 and the transmission power scheme 401 may support techniques for unequal transmission power sharing at a UE with heterogeneous PA capabilities, which may enable the UE to attain relatively higher transmission power levels without exceeding SAR or MPE constraints of the UE. For example, if a first PA of the UE has a higher uplink transmission power capability (e.g., maximum uplink transmission power) than a second PA of the UE, the UE may use a higher transmission power for the first PA (e.g., in comparison to a transmission power of the second PA), which may enable the UE to attain a higher overall transmission power (e.g., in comparison to equal transmission power splitting schemes). Increasing the effective transmission power of uplink communications from the UE may improve the reliability of such communications, which may enable the UE to attain relatively higher throughput levels, among other benefits.

Figure 5A:
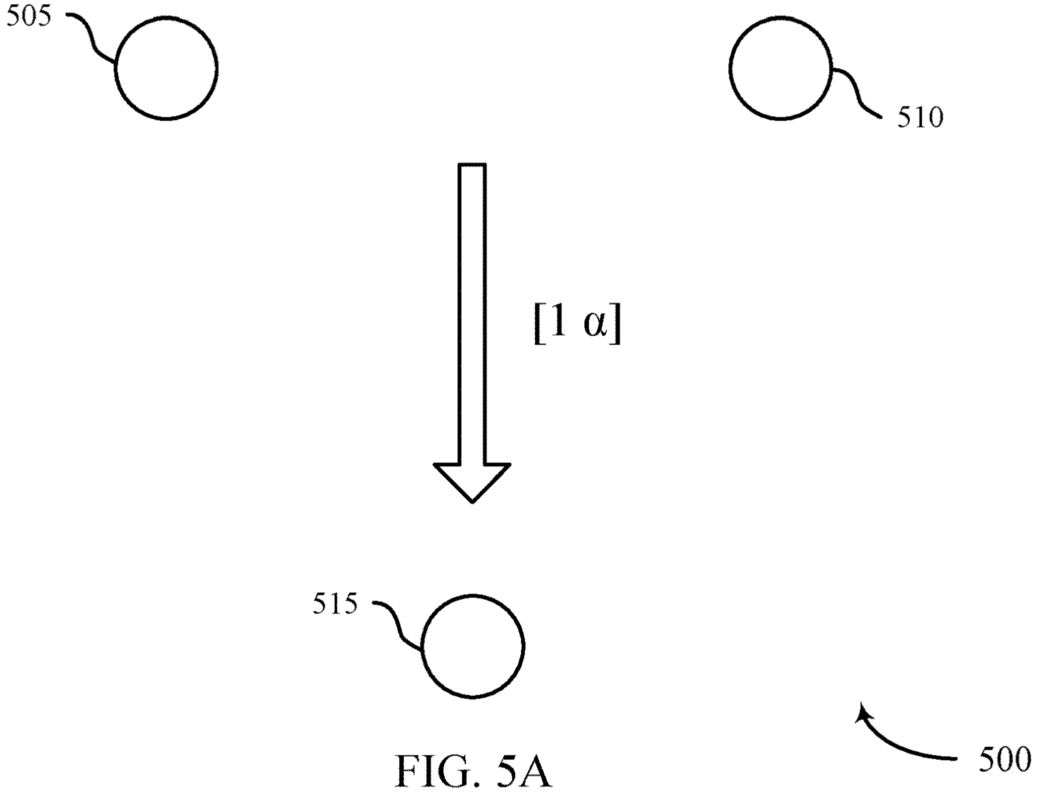
FIGS. 5A and 5B illustrate examples of port configurations that support techniques for uplink transmission power splitting in accordance with aspects of the present disclosure.
Figure 5B:
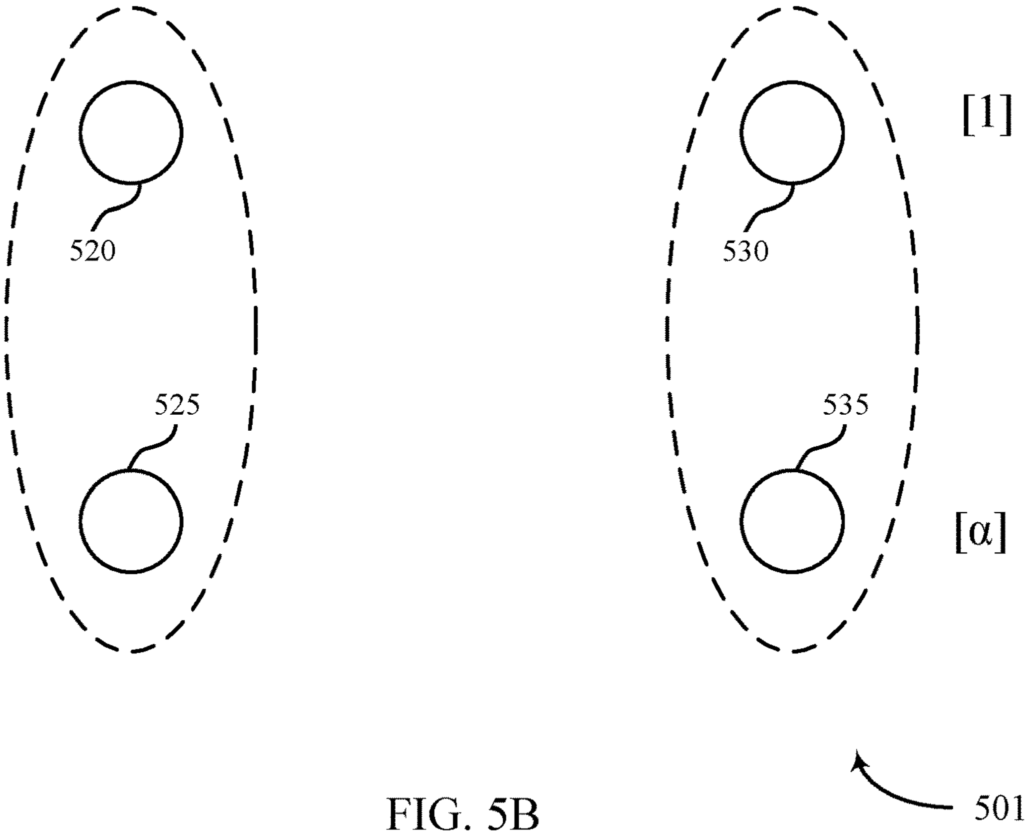

FIGS. 5A and 5B illustrate examples of a port configuration 500 and a port configuration 501 that support techniques for uplink transmission power splitting in accordance with aspects of the present disclosure. The port configuration 500 and the port configuration 501 may implement or be implemented by aspects of the wireless communications system 100 or the wireless communications system 200. For example, the port configuration 500 or the port configuration 501 may be implemented by a UE or a base station (e.g., a network entity), which may be examples of corresponding devices described with reference to FIGS. 1 and 2. The port configuration 500 may illustrate an example of a single-port SRS configuration that supports unequal transmission power splitting, whereas the port configuration 501 may illustrate an example of a dual-port SRS configuration that supports unequal transmission power splitting.

As described with reference to FIGS. 1 through 4, the techniques described herein may enable a UE to perform unequal transmission power splitting across different RF chains. For example, if the UE has a first RF chain with a maximum transmission power of 26 dBm and a second RF chain with a maximum transmission power of 23 dBm, the described techniques may enable the UE to use a higher transmission power for the first RF chain (e.g., in comparison to the second RF chain), thereby enabling the UE to attain a higher overall transmission power (e.g., in comparison to applying the same transmission power to both RF chains). In particular, the UE may be configured with an uplink transmission power sharing configuration that defines different respective transmission powers for the first and second RF chains.

In some examples, the UE may be configured to perform unequal transmission power splitting across the first and second RF chains after a transmission power threshold of the UE (e.g., the maximum transmission power of the second RF chain) has been exceeded. In other examples, the UE may be configured with a fixed transmission power differential between the first and second RF chains, and may perform unequal transmission power splitting based on this fixed transmission power differential. For example, if the maximum transmission power of the first RF chain is 3 dBm higher than the maximum transmission power of the second RF chain, the UE may apply a fixed transmission power differential of 3 dBm across the first and second RF chains, such that transmissions from the first RF chain are 3 dBm higher than transmissions from the second RF chain.

In some examples, a network entity such as a base station may provide the UE with a single-port SRS resource. If provided with a single-port SRS resource, the UE may be able to use a TPMI of the form $[1\alpha]$, where $\alpha \leq 1$ and may be dynamically determined by the UE. The same TPMI may be used for PUSCH transmissions as well, thereby coupling PUSCH and SRS power differentials across antenna ports. Using single-port SRS resources may be compatible for non-coherent UEs. Alternatively, the UE may have dedicated SRS resources, where SRS ports can be sounded at different power levels. In such examples, the UE may dynamically determine power differentials, and the same power differential may be applied to PUSCH transmissions. Using dedicated SRS resources may be compatible with coherent UEs.

In the example of FIG. 5A, the UE may be configured with a single-port SRS resource. When configured with a single-port SRS resource, the UE may perform unequal transmission power sharing by applying a TPMI of $[1\ \alpha]$ to an antenna port 505 and an antenna port 510, where $\alpha$ (e.g., a power scaling factor) is less than 1. Accordingly, the UE may transmit SRSs to a base station or other network entity using the TPMI of $[1\ \alpha]$ in combination with other precoding and code division duplexing (CDD) techniques. From the perspective of the base station or network entity, the SRSs may appear to be transmitted from a single virtual port 515 of the UE. In other words, the virtual port 515 may be synthesized from the antenna port 505 and the antenna port 510. Following these SRS transmissions, the UE may re-use the configuration of the virtual port 515 for one or more PUSCH transmissions. The port configuration 500 may enable the UE to perform uplink transmissions (e.g., SRS transmissions, PUSCH transmissions) with a higher overall transmission power (e.g., in comparison to using an equal transmission power sharing scheme across the antenna port 505 and the antenna port 510).

In the example of FIG. 5B, the UE may be configured with a set of dedicated SRS resources. In accordance with the described techniques, the UE may perform unequal transmission power splitting by sounding different antenna ports with different transmission power levels. For example, the UE may sound an antenna port 530 using a power scaling factor of 1, and may sound an antenna port 535 with a power scaling factor of $\alpha$, where $\alpha$ is less than 1. Thus, a transmission power applied to the antenna port 535 may be less than a transmission power applied to the antenna port 530. Accordingly, a base station or network entity may receive SRS transmissions from the UE at different transmission power levels. For example, the base station or network entity may receive an SRS or PUSCH transmission from the UE via an antenna port 520 at a first transmission power level corresponding to the antenna port 530, and may receive an SRS or PUSCH transmission from the UE via an antenna port 525 at a second transmission power level corresponding to the antenna port 535. The port configuration 501 may enable the UE to perform uplink transmissions (e.g., SRS transmissions, PUSCH transmissions) with a higher overall transmission power (e.g., in comparison to using an equal transmission power sharing scheme across the antenna port 530 and the antenna port 535).

As described herein, the port configuration 500 and the port configuration 501 may support techniques for unequal transmission power sharing at a UE with heterogeneous PA capabilities, which may enable the UE to attain relatively higher transmission power levels without exceeding SAR or MPE constraints of the UE. For example, if a first PA of the UE has a higher uplink transmission power capability (e.g., maximum uplink transmission power) than a second PA of the UE, the UE may use a higher transmission power for the first PA (e.g., in comparison to a transmission power of the second PA), which may enable the UE to attain a higher overall transmission power (e.g., in comparison to equal transmission power splitting schemes). Increasing the effective transmission power of uplink communications from the UE may improve the reliability of such communications and may enable the UE to attain relatively higher throughput levels, among other benefits.

Figure 6:
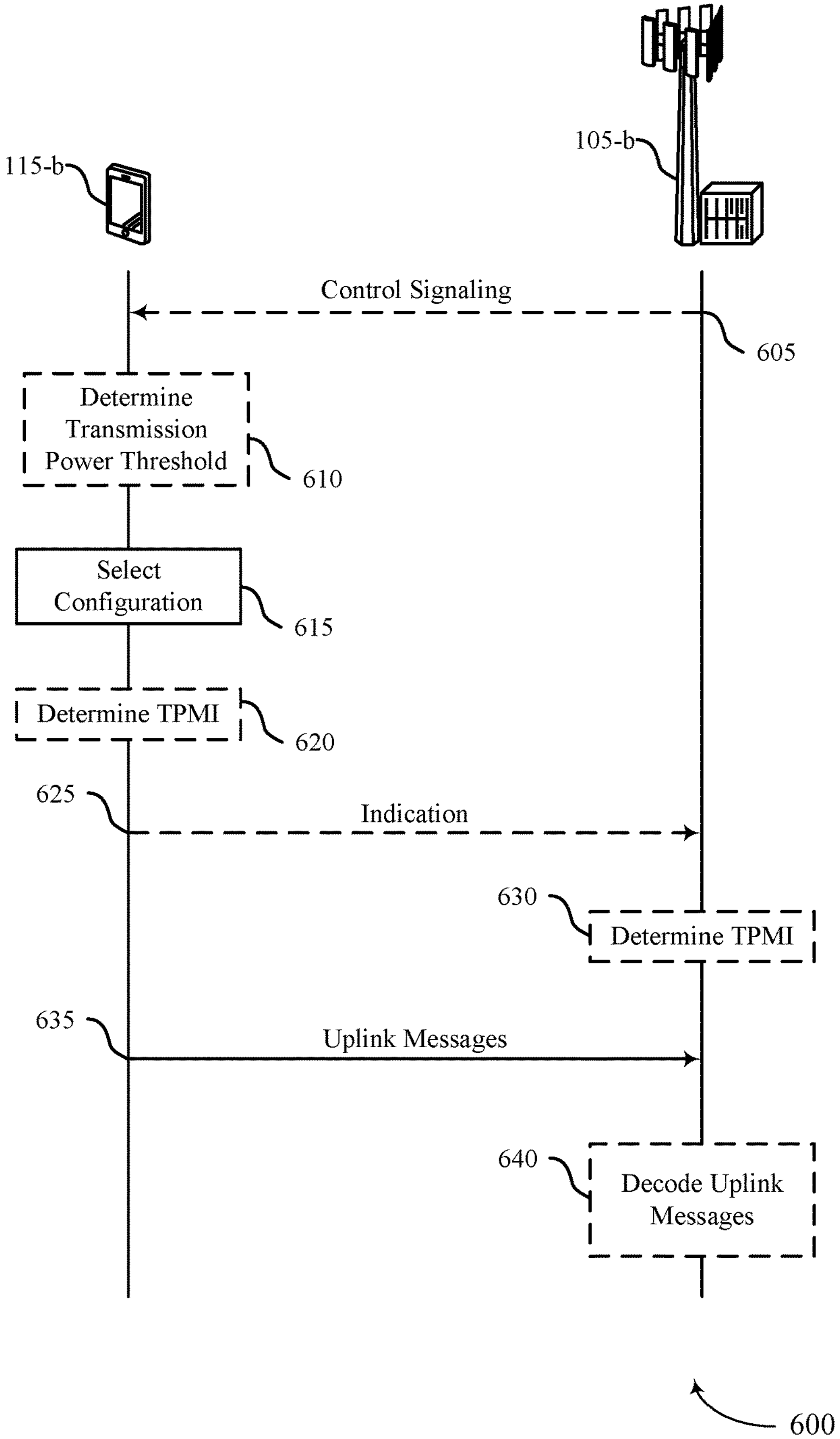
FIG. 6 illustrates an example of a process flow in a system that supports techniques for uplink transmission power splitting in accordance with aspects of the present disclosure.

FIG. 6 illustrates an example of a process flow 600 in a system that supports techniques for uplink transmission power splitting in accordance with aspects of the present disclosure. The process flow 600 may implement or be implemented by aspects of the wireless communications system 100 or the wireless communications system 200. For example, the process flow 600 may include a UE 115-*b* and a network entity 105-*b* (e.g., a network entity), which may be examples of corresponding devices described with reference to FIGS. 1 and 2. In the following description of the process flow 600, operations between the UE 115-*b* and the network entity 105-*b* may be performed in a different order or at a different time than as shown. Additionally, or alternatively, some operations may be added or omitted from the process flow 600.

In some examples, the network entity 105-*b* may transmit control signaling to the UE 115-*b* at 605. The control signaling may indicate at least an uplink transmission power sharing configuration for the UE 115-*b*, or a transmission power threshold associated with the uplink transmission power sharing configuration, or a transmission power differential associated with the uplink transmission power sharing configuration, or a combination thereof. The control signaling may also indicate whether the transmission power differential is applicable to SRS transmissions, or PUSCH transmissions, or both. Additionally, or alternatively, the control signaling may indicate a single-port resource allocated for transmission of one or more uplink messages or a set of resources allocated for transmission of the one or more uplink messages.

In some examples, the UE 115-*b* may dynamically determine the transmission power threshold at 610. For example, the UE 115-*b* may determine the transmission power threshold based on a result of a proximity detection procedure, or a PUSCH power control equation, or both. The transmission power threshold may depend on at least a first uplink transmission power capability of a first RF chain of the UE 115-*b*, or a second uplink transmission power capability of a second RF chain of the UE 115-*b*, or a SAR threshold of the UE 115-*b*, or an MPE threshold of the UE 115-*b*, or a combination thereof. The transmission power threshold may correspond to an average transmission power within a time interval or a requested transmission power for the one or more uplink messages.

At 615, the UE 115-*b* may select the uplink transmission power sharing configuration to use for transmission of the one or more uplink messages. The uplink transmission power sharing configuration may be based on the first uplink transmission power capability of the first RF chain of the UE 115-*b*, or the second uplink transmission power capability of the second RF chain of the UE 115-*b*, or both. The second uplink transmission power capability of the second RF chain may be different from the first uplink transmission power capability of the first RF chain. In some examples, the UE 115-*b* may determine to use the uplink transmission power sharing configuration based on a transmission power of the first RF chain, or a transmission power of the second RF chain, or both satisfying the transmission power threshold. Alternatively, if the transmission power of the first RF chain, or the transmission power of the second RF chain, or both are below the transmission power threshold, the UE 115-*b* may determine to use a default uplink transmission power sharing configuration (e.g., an equal transmission power sharing configuration) for transmission of the one or more uplink messages.

In some examples, the UE 115-*b* may determine a TPMI to use for transmission of the one or more uplink messages at 620. The UE 115-*b* may select the TPMI based on the uplink transmission power differential indicated by the control signaling, or the uplink transmission power sharing configuration, or both. In some examples, the TPMI may include a first value (e.g., 1) associated with a full transmission power for the first RF chain of the UE 115-*b* and a second value (e.g., a) associated with a transmission power for the second RF chain, where the second value is less than the first value. The UE 115-*b* may, in some examples, receive an indication of the first value, or the second value, or both from the network entity 105-*b*. The TPMI of the UE 115-*b* may also depend on a port configuration of the UE 115-*b* or on whether the one or more uplink messages include SRS transmissions.

In some examples, the UE 115-*b* may transmit an indication of the selected uplink transmission power sharing configuration to the network entity 105-*b* at 625. For example, the UE 115-*b* may include an indication of the selected uplink transmission power sharing configuration in a PHR. Additionally, or alternatively, the UE 115-*b* may embed an indication of the selected uplink transmission power sharing configuration in UCI. The UE 115-*b* may also transmit (e.g., to the network entity 105-*b*) an indication of the transmission power differential between the first RF chain and the second RF chain. In some examples, the network entity 105-*b* may determine the TPMI of the UE 115-*b* at 630. The network entity 105-*b* may determine the TPMI of the UE 115-*b* based on the uplink transmission power sharing configuration selected by the UE 115-*b*.

At 635, the UE 115-*b* may transmit the one or more uplink messages to the network entity 105-*b* in accordance with the uplink transmission power sharing configuration. For example, the UE 115-*b* may transmit the one or more uplink messages via the first RF chain using a first transmission power, and may transmit the one or more uplink messages via the second RF chain using a second transmission power that is different from the second transmission power. In some examples, the UE 115-*b* may transmit the one or more uplink messages to the network entity 105-*b* based on the uplink transmission power differential between the first RF chain and the second RF chain. The one or more uplink messages may include PUSCH transmissions, or SRS transmissions, or both. If the one or more uplink messages include SRS transmissions, the UE 115-*b* may, in some examples, sound two or more ports using the set of resources indicated by the control signaling. In some examples, the UE 115-*b* may transmit the one or more uplink messages across multiple RF spectrum bands in accordance with a dynamic uplink transmission power aggregation scheme.

In some examples, the network entity 105-*b* may decode the one or more uplink messages at 640. The network entity 105-*b* may decode the one or more uplink messages in accordance with a coherent detection scheme or a non-coherent detection scheme. Additionally, or alternatively, the network entity 105-*b* may decode the one or more uplink messages based on the TPMI of the UE 115-*b*. If, for example, the one or more uplink messages include SRS transmissions, the network entity 105-*b* may perform uplink channel estimation based on performing a set of measurements on the one or more uplink messages. For example, the network entity 105-*b* may estimate multipath fading, doppler shift, and transmission power loss for an uplink channel between the UE 115-*b* and the network entity 105-*b* based on performing an uplink channel estimation procedure.

The process flow 600 may support techniques for unequal transmission power sharing at the UE 115-*b* (e.g., a UE with heterogeneous PA capabilities), which may enable the UE 115-*b* to attain relatively higher transmission power levels without exceeding SAR or MPE constraints of the UE 115-*b*. For example, if a first PA of the UE 115-*b* has a higher uplink transmission power capability (e.g., maximum uplink transmission power) than a second PA of the UE 115-*b*, the UE 115-*b* may use a higher transmission power for the first PA (e.g., in comparison to a transmission power of the second PA), which may enable the UE 115-*b* to attain a higher overall transmission power (e.g., in comparison to equal transmission power splitting schemes). Increasing the effective transmission power of uplink communications from the UE 115-*b* may improve the reliability of such communications and may enable the UE 115-*b* to attain relatively higher throughput levels, among other benefits.

Figure 7:
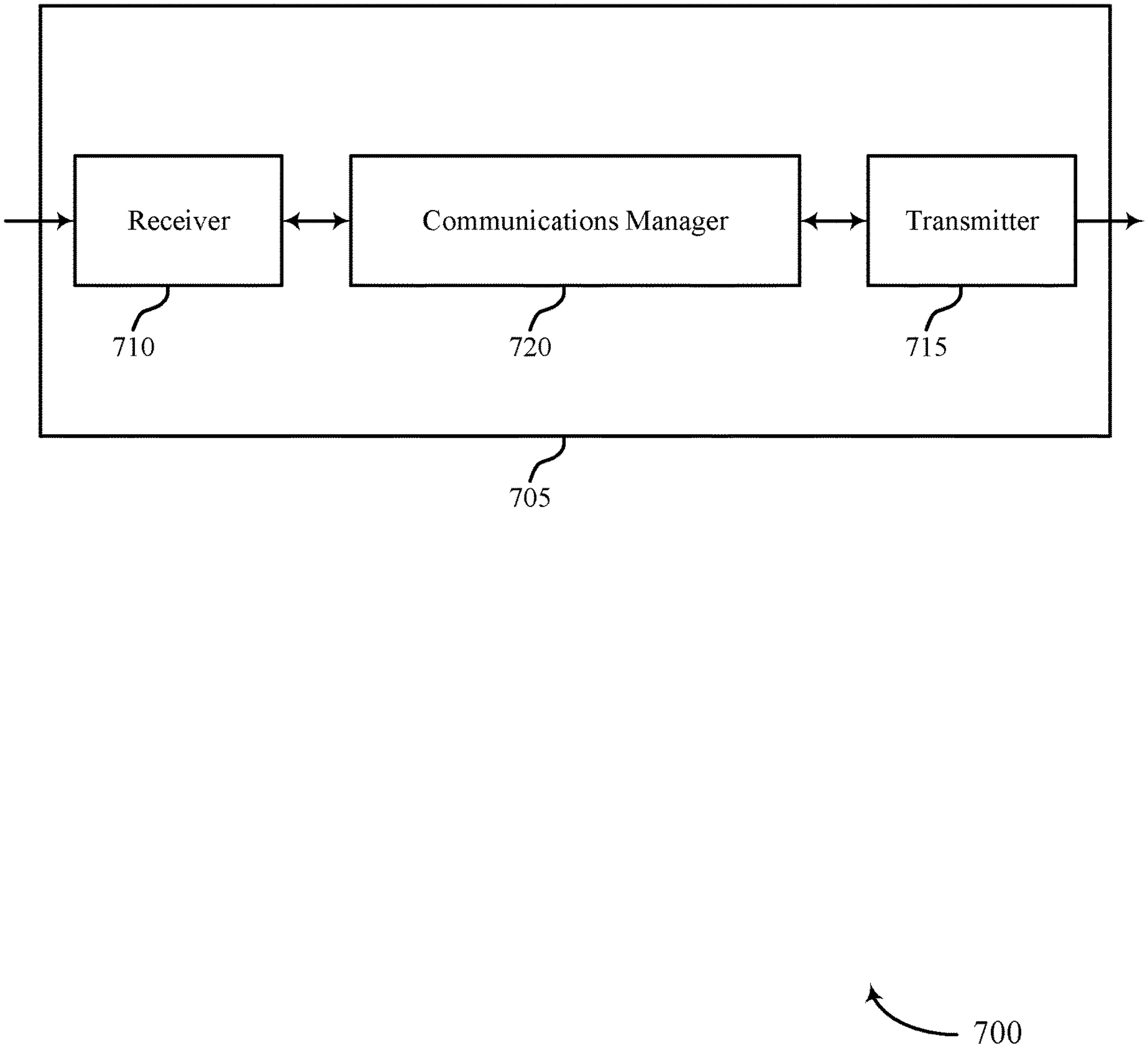
FIGS. 7 and 8 show block diagrams of devices that support techniques for uplink transmission power splitting in accordance with aspects of the present disclosure.

FIG. 7 shows a block diagram 700 of a device 705 that supports techniques for uplink transmission power splitting in accordance with aspects of the present disclosure. The device 705 may be an example of aspects of a UE 115 as described herein. The device 705 may include a receiver 710, a transmitter 715, and a communications manager 720. The device 705 may also include one or more processors, memory coupled with the one or more processors, and instructions stored in the memory that are executable by the one or more processors to enable the one or more processors to perform the transmission power management features discussed herein. Each of these components may be in communication with one another (e.g., via one or more buses).

The receiver 710 may provide a means for receiving information that includes at least packets, or user data, or control information, or a combination thereof associated with various information channels (e.g., control channels, data channels, information channels related to techniques for uplink transmission power splitting). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information that includes at least packets, or user data, or control information, or a combination thereof associated with various information channels (e.g., control channels, data channels, information channels related to techniques for uplink transmission power splitting). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for uplink transmission power splitting as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include at least a processor, or a digital signal processor (DSP), or an application-specific integrated circuit (ASIC), or a field-programmable gate array (FPGA) or other programmable logic device, or a discrete gate or transistor logic, or discrete hardware components, or a combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, or the transmitter 715, or both. For example, the communications manager 720 may receive information from the receiver 710, send information to the transmitter 715, or be integrated in combination with the receiver 710, or the transmitter 715, or both to receive information, transmit information, or perform various other operations as described herein.

The communications manager 720 may support wireless communications at the device 705 (e.g., a UE) in accordance with examples as disclosed herein. For example, the communications manager 720 may be configured as or otherwise support a means for selecting an uplink transmission power sharing configuration for transmission of one or more uplink messages, where the uplink transmission power sharing configuration is based on a first uplink transmission power capability of a first RF chain of the device 705 and on a second uplink transmission power capability of a second RF chain of the device 705 that is different from the first RF chain. The communications manager 720 may be configured as or otherwise support a means for transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

By including or configuring the communications manager 720 in accordance with examples as described herein, the device 705 (e.g., a processor controlling or otherwise coupled to at least the receiver 710, or the transmitter 715, or the communications manager 720, or a combination thereof) may support techniques for reduced power consumption by reducing a number of retransmissions performed by the device 705. For example, the techniques described herein may enable the device 705 to attain a relatively higher uplink transmission power, which may improve the reliability of uplink transmissions from the device 705. As such, the device 705 may perform fewer retransmissions, which may enable the device 705 to remain in sleep mode for a relatively longer duration.

Figure 8:
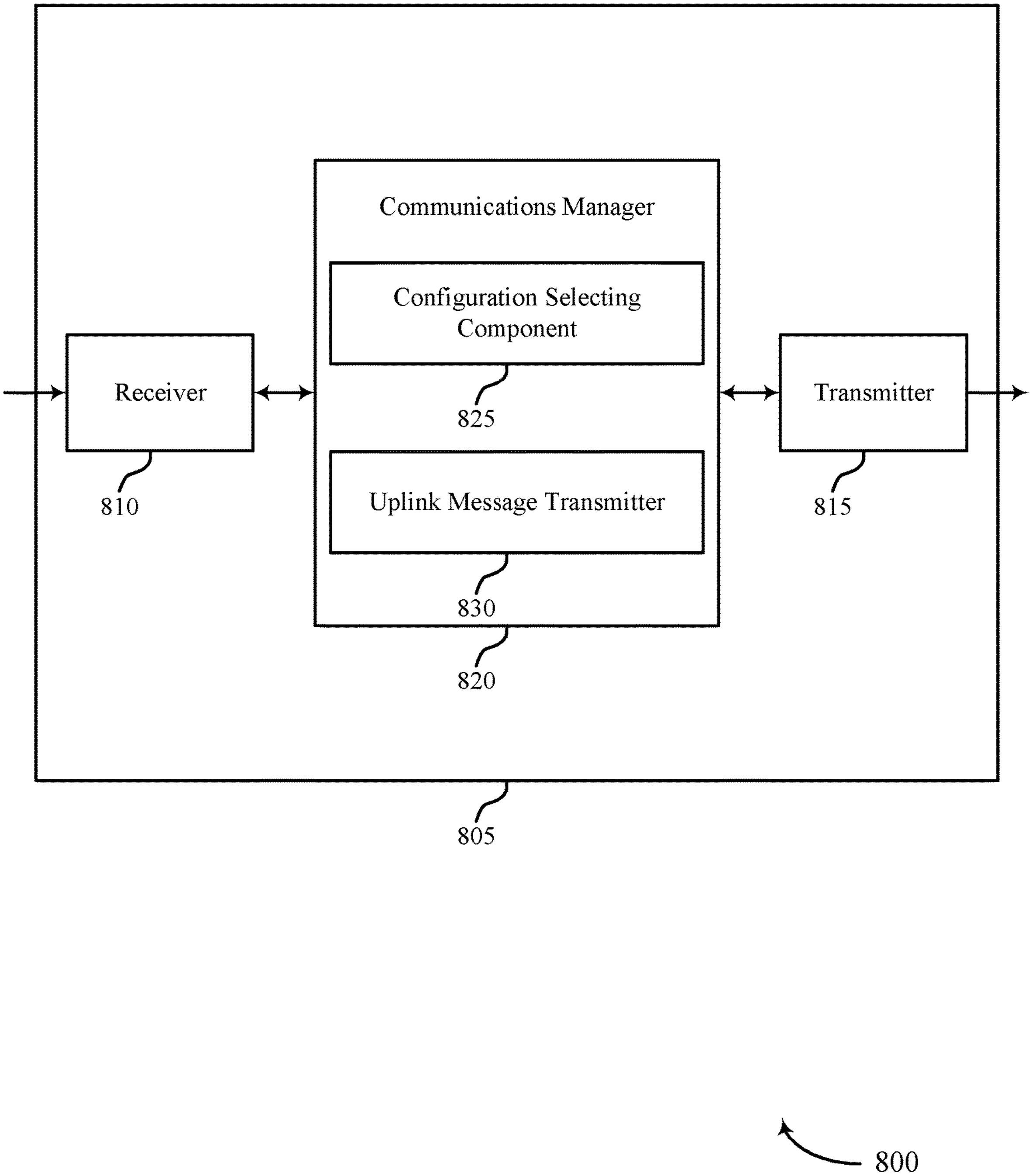

FIG. 8 shows a block diagram 800 of a device 805 that supports techniques for uplink transmission power splitting in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information that includes at least packets, or user data, or control information, or a combination thereof associated with various information channels (e.g., control channels, data channels, information channels related to techniques for uplink transmission power splitting). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information that includes at least packets, or user data, or control information, or a combination thereof associated with various information channels (e.g., control channels, data channels, information channels related to techniques for uplink transmission power splitting). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for uplink transmission power splitting as described herein. For example, the communications manager 820 may include at least a configuration selecting component 825, or an uplink message transmitter 830, or a combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, or the transmitter 815, or both. For example, the communications manager 820 may receive information from the receiver 810, send information to the transmitter 815, or be integrated in combination with the receiver 810, or the transmitter 815, or both to receive information, transmit information, or perform various other operations as described herein.

The communications manager 820 may support wireless communications at the device 805 (e.g., a UE) in accordance with examples as disclosed herein. The configuration selecting component 825 may be configured as or otherwise support a means for selecting an uplink transmission power sharing configuration for transmission of one or more uplink messages, where the uplink transmission power sharing configuration is based on a first uplink transmission power capability of a first RF chain of the device 805 and on a second uplink transmission power capability of a second RF chain of the device 805 that is different from the first RF chain. The uplink message transmitter 830 may be configured as or otherwise support a means for transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

In some cases, the configuration selecting component 825 and the uplink message transmitter 830 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration selecting component 825 and the uplink message transmitter 830 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 9:
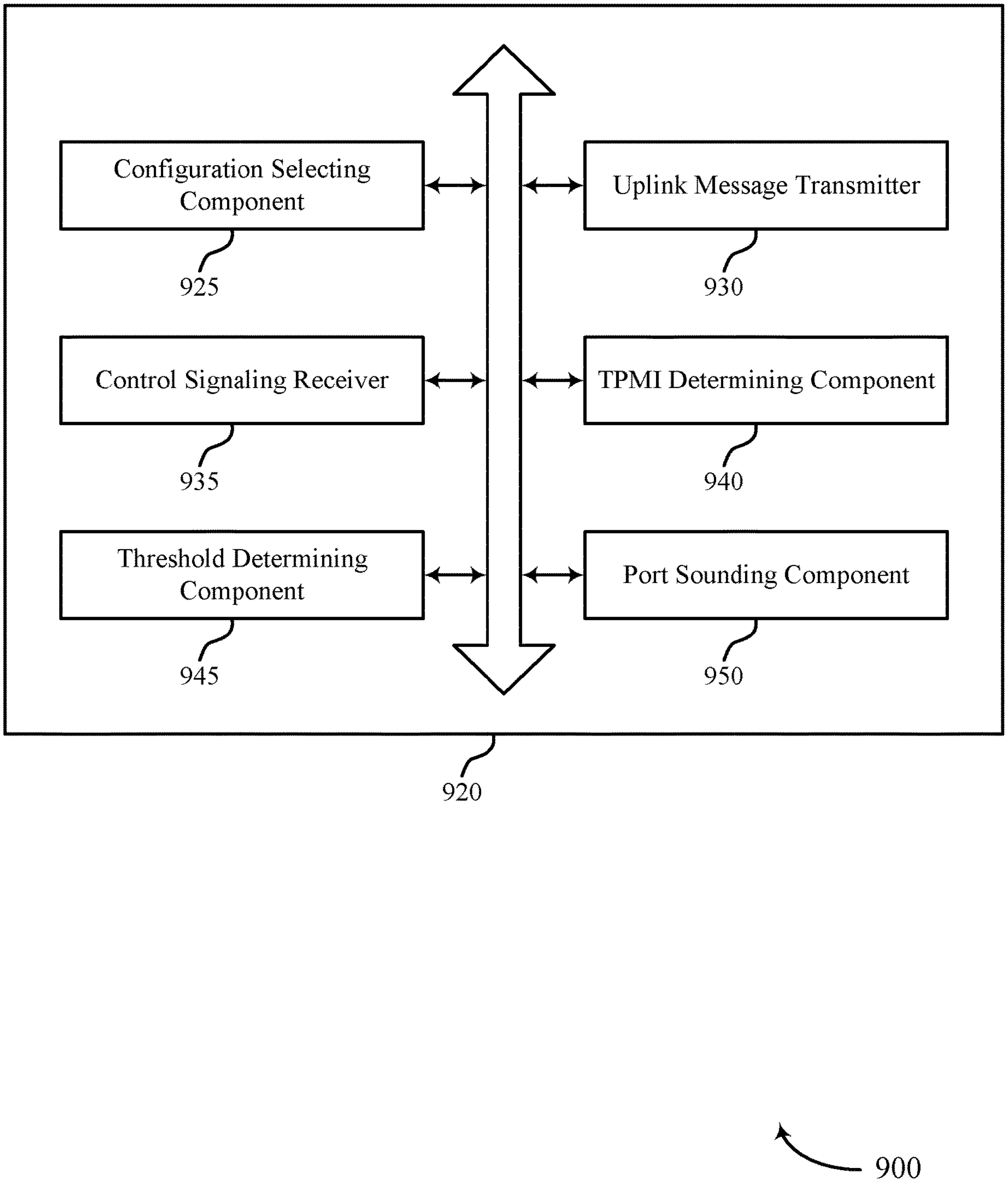
FIG. 9 shows a block diagram of a communications manager that supports techniques for uplink transmission power splitting in accordance with aspects of the present disclosure.

FIG. 9 shows a block diagram 900 of a communications manager 920 that supports techniques for uplink transmission power splitting in accordance with aspects of the present disclosure. The communications manager 920 may be an example of aspects of a communications manager 720, or a communications manager 820, or both, as described herein. The communications manager 920, or various components thereof, may be an example of means for performing various aspects of techniques for uplink transmission power splitting as described herein. For example, the communications manager 920 may include at least a configuration selecting component 925, or an uplink message transmitter 930, or a control signaling receiver 935, or a TPMI determining component 940, or a threshold determining component 945, or a port sounding component 950, or a combination thereof. Each of these components may communicate, directly or indirectly, with one another (e.g., via one or more buses).

The communications manager 920 may support wireless communications at a UE in accordance with examples as disclosed herein. The configuration selecting component 925 may be configured as or otherwise support a means for selecting an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain. The uplink message transmitter 930 may be configured as or otherwise support a means for transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

In some examples, the control signaling receiver 935 may be configured as or otherwise support a means for receiving, from the network entity, control signaling indicating the uplink transmission power sharing configuration, where selecting the uplink transmission power sharing configuration for transmission of the one or more uplink messages is based on the control signaling.

In some examples, the configuration selecting component 925 may be configured as or otherwise support a means for determining to use the uplink transmission power sharing configuration for transmission of the one or more uplink messages based on a transmission power of the first RF chain, or a transmission power of the second RF chain, or both satisfying a transmission power threshold, where selecting the uplink transmission power sharing configuration is based on the determination. In some examples, the configuration selecting component 925 may be configured as or otherwise support a means for determining to use a default uplink transmission power sharing configuration for transmission of the one or more uplink messages based on comparing a transmission power of the first RF chain, or a transmission power of the second RF chain, or both to a transmission power threshold. In some examples, the transmission power includes an average transmission power within a time interval or a requested transmission power for the one or more uplink messages.

In some examples, the control signaling receiver 935 may be configured as or otherwise support a means for receiving control signaling indicating the transmission power threshold, where selecting the uplink transmission power sharing configuration for transmission of the one or more uplink messages is based on the control signaling. In some examples, the transmission power threshold is based on at least the first uplink transmission power capability of the first RF chain of the UE, or the second uplink transmission power capability of the second RF chain of the UE, or a SAR threshold of the UE, or an MPE threshold of the UE, or a combination thereof.

In some examples, the threshold determining component 945 may be configured as or otherwise support a means for determining the transmission power threshold based on a result of a proximity detection procedure, or a PUSCH power control equation, or both.

In some examples, to support transmitting the one or more uplink messages, the uplink message transmitter 930 may be configured as or otherwise support a means for transmitting the one or more uplink messages to the network entity based on an uplink transmission power differential between the first RF chain of the UE and the second RF chain of the UE. In some examples, the uplink message transmitter 930 may be configured as or otherwise support a means for transmitting, to the network entity, an indication of the uplink transmission power differential between the first RF chain of the UE and the second RF chain of the UE.

In some examples, the control signaling receiver 935 may be configured as or otherwise support a means for receiving, from the network entity, an indication of whether the uplink transmission power differential is applicable to SRS transmissions from the UE, or PUSCH transmissions from the UE, or both. In some examples, the control signaling receiver 935 may be configured as or otherwise support a means for receiving control signaling configuring a set of resources for the one or more uplink messages. In some examples, the control signaling receiver 935 may be configured as or otherwise support a means for receiving control signaling configuring a single-port resource for transmission of the one or more uplink messages.

In some examples, the port sounding component 950 may be configured as or otherwise support a means for sounding two or more ports using the set of resources based on the uplink transmission power differential.

In some examples, the configuration selecting component 925 may be configured as or otherwise support a means for selecting a TPMI based on the uplink transmission power differential, the TPMI including a first value associated with a full transmission power for the first RF chain and a second value that is less than the first value, the second value associated with a transmission power for the second RF chain, where the one or more uplink messages are transmitted using the single-port resource and the TPMI.

In some examples, the control signaling receiver 935 may be configured as or otherwise support a means for receiving, from the network entity, an indication of the uplink transmission power differential between the first RF chain of the UE and the second RF chain of the UE. In some examples, the control signaling receiver 935 may be configured as or otherwise support a means for receiving, from the network entity, a control message indicating the first value associated with the full transmission power for the first RF chain, or the second value associated with the transmission power for the second RF chain, or both.

In some examples, the TPMI determining component 940 may be configured as or otherwise support a means for determining, based on the uplink transmission power sharing configuration, a TPMI to use for transmission of the one or more uplink messages. In some examples, the uplink message transmitter 930 may be configured as or otherwise support a means for transmitting, to the network entity, a PHR indicating the uplink transmission power sharing configuration selected by the UE. In some examples, the uplink message transmitter 930 may be configured as or otherwise support a means for transmitting, to the network entity, UCI indicating the uplink transmission power sharing configuration selected by the UE.

In some examples, to support transmitting the one or more uplink messages, the uplink message transmitter 930 may be configured as or otherwise support a means for transmitting, via the first RF chain, the one or more uplink messages in a first RF spectrum band. In some examples, to support transmitting the one or more uplink messages, the uplink message transmitter 930 may be configured as or otherwise support a means for transmitting, via the second RF chain, the one or more uplink messages in a second RF spectrum band that is different from the first RF spectrum band. In some examples, the one or more uplink messages include PUSCH transmissions, or SRS transmissions, or both.

In some cases, the configuration selecting component 925, the uplink message transmitter 930, the control signaling receiver 935, the TPMI determining component 940, the threshold determining component 945, and the port sounding component 950 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the configuration selecting component 925, the uplink message transmitter 930, the control signaling receiver 935, the TPMI determining component 940, the threshold determining component 945, and the port sounding component 950 discussed herein.

Figure 10:
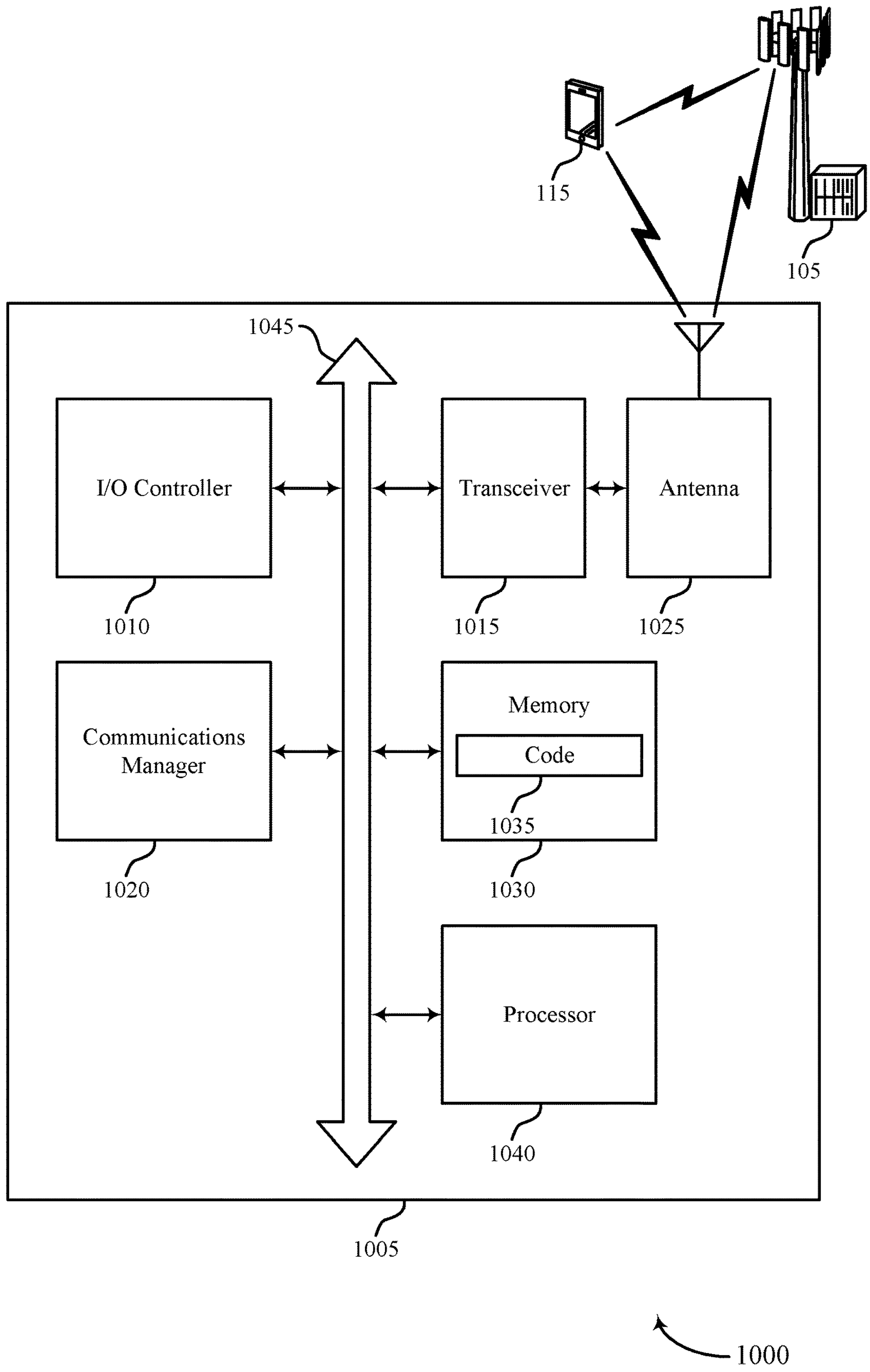
FIG. 10 shows a diagram of a system including a device that supports techniques for uplink transmission power splitting in accordance with aspects of the present disclosure.

FIG. 10 shows a diagram of a system 1000 including a device 1005 that supports techniques for uplink transmission power splitting in accordance with aspects of the present disclosure. The device 1005 may be an example of or include the components of a device 705, a device 805, or a UE 115 as described herein. The device 1005 may communicate wirelessly with one or more network entities 105, or one or more UEs 115, or a combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of at least a transmitter 715, or a transmitter 815, or a receiver 710, or a receiver 810, or a combination or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include at least an intelligent hardware device (e.g., a general-purpose processor, or a DSP, or a CPU, or a microcontroller, or an ASIC, or an FPGA, or a programmable logic device, or a discrete gate or transistor logic component, or a discrete hardware component, or a combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for uplink transmission power splitting). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at the device 1005 (e.g., a UE) in accordance with examples as disclosed herein. For example, the communications manager 1020 may be configured as or otherwise support a means for selecting an uplink transmission power sharing configuration for transmission of one or more uplink messages, where the uplink transmission power sharing configuration is based on a first uplink transmission power capability of a first RF chain of the device 1005 and on a second uplink transmission power capability of a second RF chain of the device 1005 that is different from the first RF chain. The communications manager 1020 may be configured as or otherwise support a means for transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power.

By including or configuring the communications manager 1020 in accordance with examples as described herein, the device 1005 may support techniques for unequal transmission power sharing at the device 1005 (e.g., a UE with heterogeneous PA transmission power capabilities), which may enable the device 1005 to attain relatively higher transmission power levels (without exceeding SAR or MPE constraints of the device 1005). For example, if a first PA of the device 1005 has a higher uplink transmission power capability (e.g., maximum uplink transmission power) than a second PA of the device 1005, the device 1005 may use a higher transmission power for the first PA (e.g., in comparison to a transmission power of the second PA), which may enable the device 1005 to attain a higher overall transmission power (e.g., in comparison to equal transmission power splitting schemes). Increasing the effective transmission power of uplink communications from the device 1005 may improve the reliability of such communications, and may enable the device 1005 to attain relatively higher throughput levels, among other benefits.

In some examples, the communications manager 1020 may be configured to perform various operations (e.g., receiving, monitoring, transmitting) using or otherwise in cooperation with at least the transceiver 1015, or the one or more antennas 1025, or a combination thereof. Although the communications manager 1020 is illustrated as a separate component, in some examples, one or more functions described with reference to the communications manager 1020 may be supported by or performed by at least the processor 1040, or the memory 1030, or the code 1035, or a combination thereof. For example, the code 1035 may include instructions executable by the processor 1040 to cause the device 1005 to perform various aspects of techniques for uplink transmission power splitting as described herein, or the processor 1040 and the memory 1030 may be otherwise configured to perform or support such operations.

Figure 11:
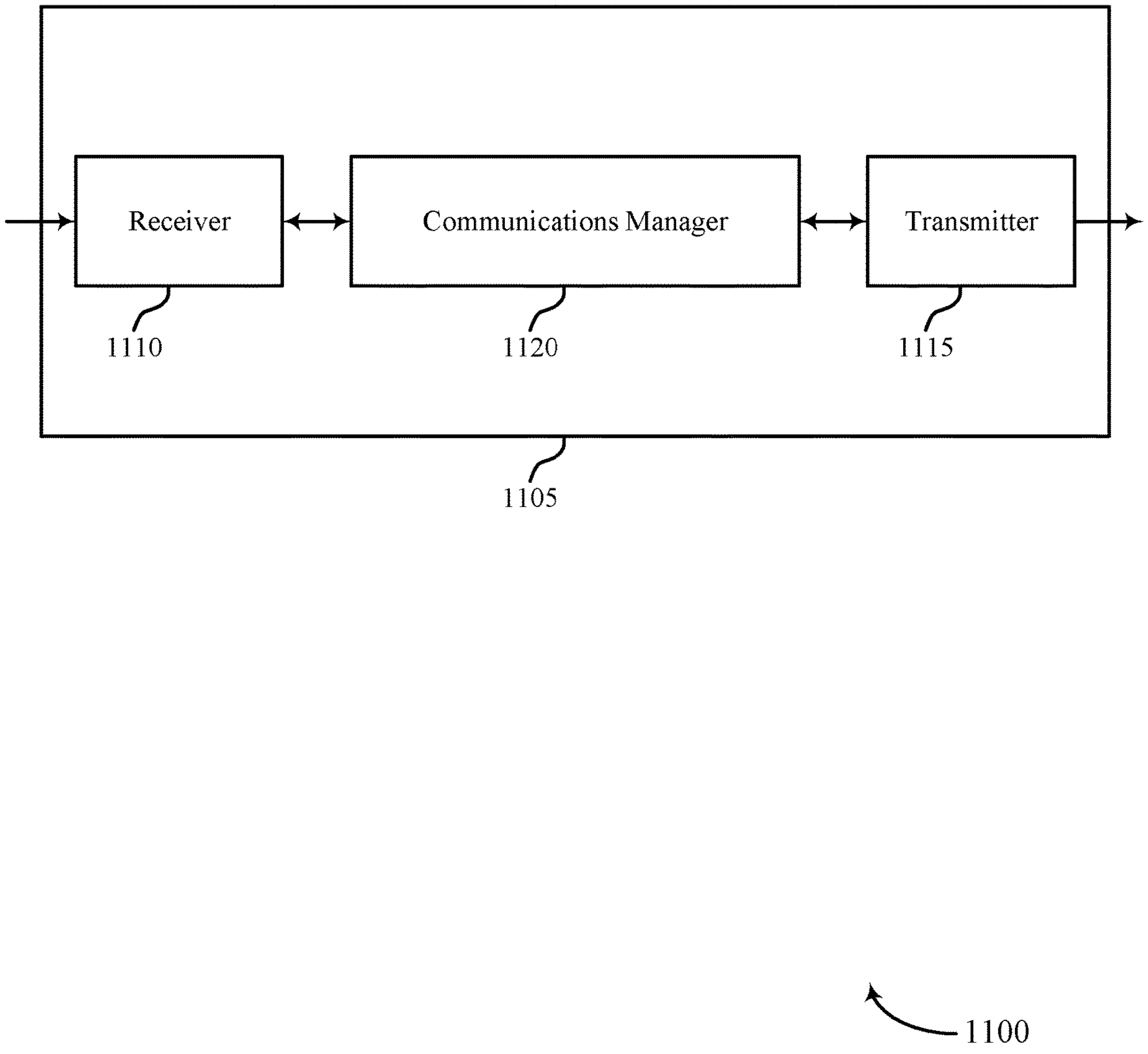
FIGS. 11 and 12 show block diagrams of devices that support techniques for uplink transmission power splitting in accordance with aspects of the present disclosure.

FIG. 11 shows a block diagram 1100 of a device 1105 that supports techniques for uplink transmission power splitting in accordance with aspects of the present disclosure. The device 1105 may be an example of aspects of a network entity (e.g., a network entity 105) as described herein. The device 1105 may include a receiver 1110, a transmitter 1115, and a communications manager 1120. The device 1105 may also include one or more processors, memory coupled with the one or more processors, and instructions stored in the memory that are executable by the one or more processors to enable the one or more processors to perform the transmission power management features discussed herein. Each of these components may be in communication with one another (e.g., via one or more buses).

The receiver 1110 may provide a means for receiving information including at least packets, or user data, or control information, or a combination thereof associated with various information channels (e.g., control channels, data channels, information channels related to techniques for uplink transmission power splitting). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information that includes at least packets, or user data, or control information, or a combination thereof associated with various information channels (e.g., control channels, data channels, information channels related to techniques for uplink transmission power splitting). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for uplink transmission power splitting as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include at least a processor, or a DSP, or an ASIC, or an FPGA or other programmable logic device, or a discrete gate or transistor logic, or discrete hardware components, or a combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, or the transmitter 1115, or both. For example, the communications manager 1120 may receive information from the receiver 1110, send information to the transmitter 1115, or be integrated in combination with the receiver 1110, or the transmitter 1115, or both to receive information, transmit information, or perform various other operations as described herein.

The communications manager 1120 may support wireless communications at the device 1105 (e.g., a network entity) in accordance with examples as disclosed herein. For example, the communications manager 1120 may be configured as or otherwise support a means for transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The communications manager 1120 may be configured as or otherwise support a means for receiving one or more uplink messages from the UE in accordance with the uplink transmission power sharing configuration, where the one or more uplink messages are received at a first transmission power and at a second transmission power that is different from the first transmission power.

By including or configuring the communications manager 1120 in accordance with examples as described herein, the device 1105 (e.g., a processor controlling or otherwise coupled to at least the receiver 1110, or the transmitter 1115, or the communications manager 1120, or a combination thereof) may support techniques for reduced power consumption by reducing the number of retransmissions requested by the device 1105. As such, the device 1105 may remain in sleep mode for a relatively longer duration, which may result in improved power savings at the device 1105, among other benefits.

Figure 12:
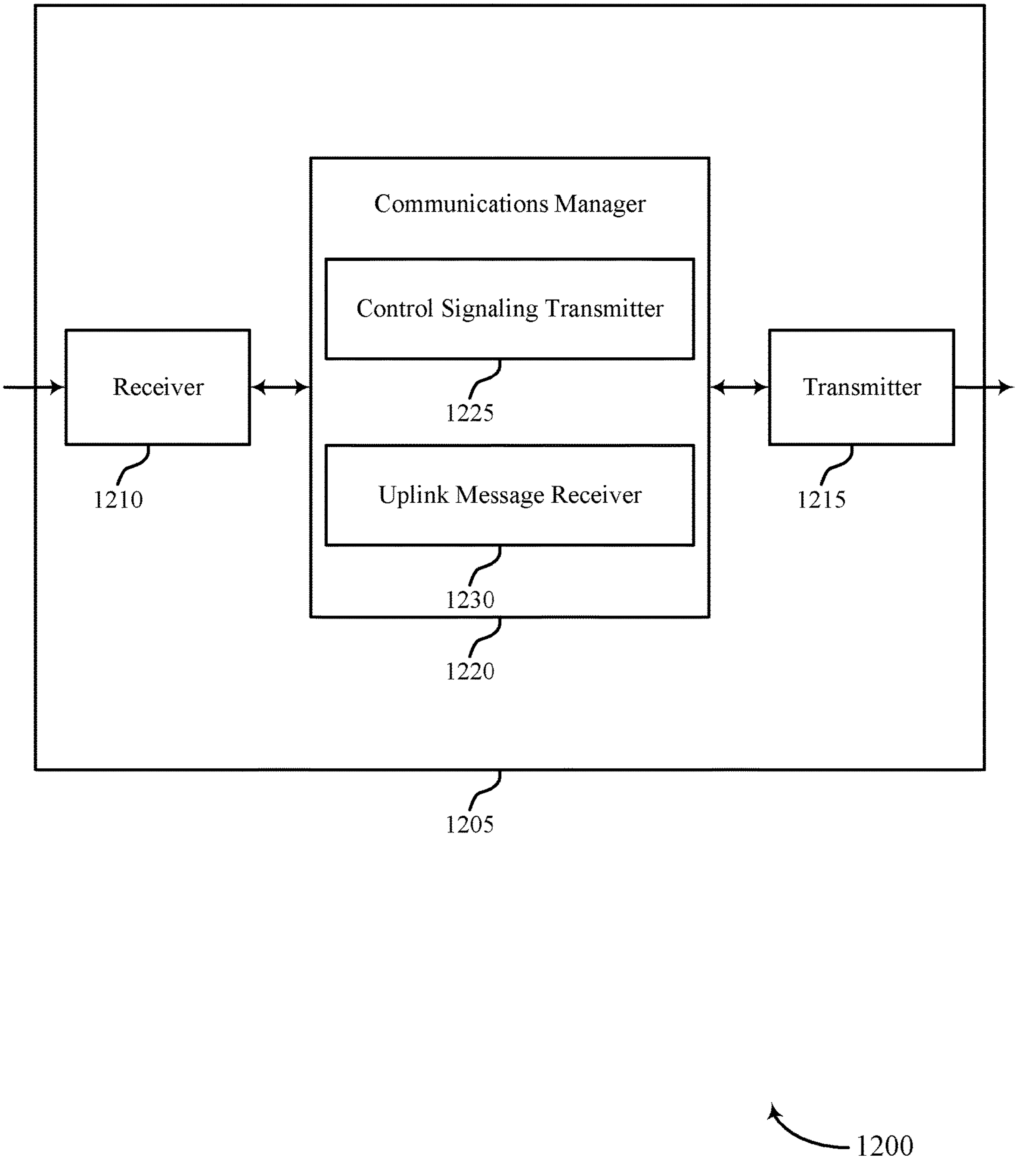

FIG. 12 shows a block diagram 1200 of a device 1205 that supports techniques for uplink transmission power splitting in accordance with aspects of the present disclosure. The device 1205 may be an example of aspects of a device 1105 or a network entity (e.g., a network entity 105) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information that includes at least packets, or user data, or control information, or a combination thereof associated with various information channels (e.g., control channels, data channels, information channels related to techniques for uplink transmission power splitting). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information that includes at least packets, or user data, or control information, or a combination thereof associated with various information channels (e.g., control channels, data channels, information channels related to techniques for uplink transmission power splitting). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for uplink transmission power splitting as described herein. For example, the communications manager 1220 may include at least a control signaling transmitter 1225, or an uplink message receiver 1230, or both. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, or the transmitter 1215, or both. For example, the communications manager 1220 may receive information from the receiver 1210, send information to the transmitter 1215, or be integrated in combination with the receiver 1210, or the transmitter 1215, or both to receive information, transmit information, or perform various other operations as described herein.

The communications manager 1220 may support wireless communications at the device 1205 (e.g., a network entity) in accordance with examples as disclosed herein. The control signaling transmitter 1225 may be configured as or otherwise support a means for transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The uplink message receiver 1230 may be configured as or otherwise support a means for receiving one or more uplink messages from the UE in accordance with the uplink transmission power sharing configuration, where the one or more uplink messages are received at a first transmission power and at a second transmission power that is different from the first transmission power.

In some cases, the control signaling transmitter 1225 and the uplink message receiver 1230 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmitter 1225 and the uplink message receiver 1230 discussed herein. A transceiver processor may be collocated with and/or communicate with (e.g., direct the operations of) a transceiver of the device. A radio processor may be collocated with and/or communicate with (e.g., direct the operations of) a radio (e.g., an NR radio, an LTE radio, a Wi-Fi radio) of the device. A transmitter processor may be collocated with and/or communicate with (e.g., direct the operations of) a transmitter of the device. A receiver processor may be collocated with and/or communicate with (e.g., direct the operations of) a receiver of the device.

Figure 13:
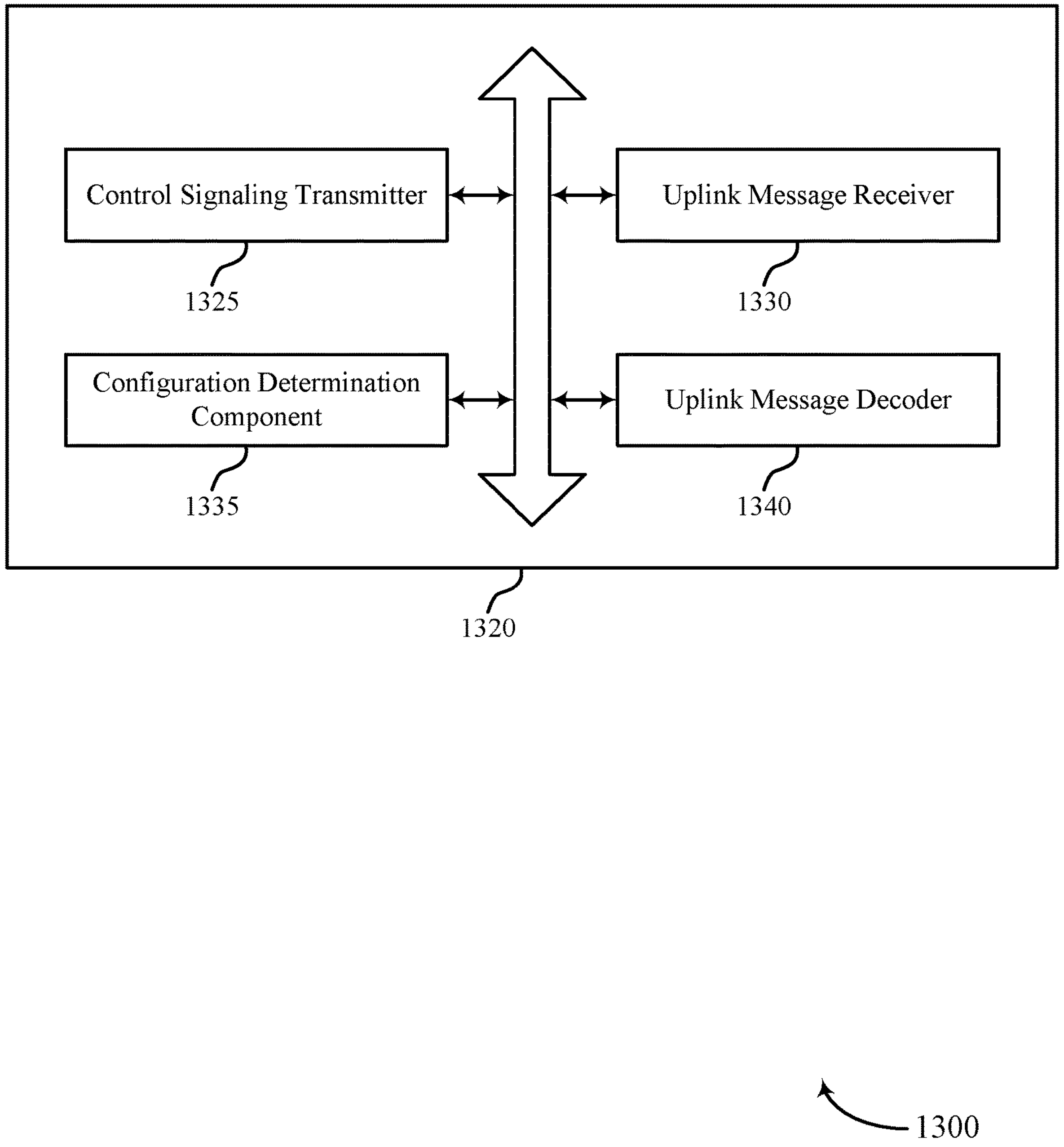
FIG. 13 shows a block diagram of a communications manager that supports techniques for uplink transmission power splitting in accordance with aspects of the present disclosure.

FIG. 13 shows a block diagram 1300 of a communications manager 1320 that supports techniques for uplink transmission power splitting in accordance with aspects of the present disclosure. The communications manager 1320 may be an example of aspects of a communications manager 1120, or a communications manager 1220, or both, as described herein. The communications manager 1320, or various components thereof, may be an example of means for performing various aspects of techniques for uplink transmission power splitting as described herein. For example, the communications manager 1320 may include at least a control signaling transmitter 1325, or an uplink message receiver 1330, or a configuration determination component 1335, or an uplink message decoder 1340, or a combination thereof. Each of these components may communicate, directly or indirectly, with one another (e.g., via one or more buses).

The communications manager 1320 may support wireless communications at a network entity in accordance with examples as disclosed herein. The control signaling transmitter 1325 may be configured as or otherwise support a means for transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The uplink message receiver 1330 may be configured as or otherwise support a means for receiving one or more uplink messages from the UE in accordance with the uplink transmission power sharing configuration, where the one or more uplink messages are received at a first transmission power and at a second transmission power that is different from the first transmission power.

In some examples, to support transmitting the control signaling, the control signaling transmitter 1325 may be configured as or otherwise support a means for transmitting the control signaling indicating the uplink transmission power sharing configuration, or a transmission power threshold associated with the uplink transmission power sharing configuration, or both, where receiving the one or more uplink messages from the UE is based on the control signaling. In some examples, the transmission power threshold is based on at least the first uplink transmission power capability of the first RF chain of the UE, or the second uplink transmission power capability of the second RF chain of the UE, or a SAR threshold of the UE, or an MPE threshold of the UE, or a combination thereof.

In some examples, the uplink message receiver 1330 may be configured as or otherwise support a means for receiving, from the UE, an indication of an uplink transmission power differential between the first RF chain of the UE and the second RF chain of the UE.

In some examples, the control signaling transmitter 1325 may be configured as or otherwise support a means for transmitting, to the UE, an indication of whether the uplink transmission power differential is applicable to SRS transmissions from the UE, or PUSCH transmissions from the UE, or both.

In some examples, the control signaling transmitter 1325 may be configured as or otherwise support a means for transmitting control signaling configuring a single-port resource for transmission of the one or more uplink messages. In some examples, the configuration determination component 1335 may be configured as or otherwise support a means for determining a TPMI of the UE based on the uplink transmission power differential and on the single-port resource, the TPMI including a first value associated with a full transmission power for the first RF chain of the UE and a second value that is less than the first value, the second value associated with a transmission power for the second RF chain of the UE. In some examples, the uplink message decoder 1340 may be configured as or otherwise support a means for decoding the one or more uplink messages using the TPMI.

In some examples, the control signaling transmitter 1325 may be configured as or otherwise support a means for transmitting control signaling configuring a set of resources for transmission of one or more SRSs. In some examples, the uplink message receiver 1330 may be configured as or otherwise support a means for receiving the one or more SRSs from the UE using the set of resources and based on the uplink transmission power differential.

In some examples, the uplink message receiver 1330 may be configured as or otherwise support a means for receiving a PHR, or UCI, or both from the UE. In some examples, the configuration determination component 1335 may be configured as or otherwise support a means for determining that the UE is using the uplink transmission power sharing configuration based on the PHR, the UCI, or both.

In some examples, the uplink message decoder 1340 may be configured as or otherwise support a means for decoding the one or more uplink messages from the UE in accordance with a coherent detection scheme or in accordance with a non-coherent detection scheme. In some examples, the one or more uplink messages include PUSCH transmissions, or SRS transmissions, or both.

In some cases, the control signaling transmitter 1325, the uplink message receiver 1330, the configuration determination component 1335, and the uplink message decoder 1340 may each be or be at least a part of a processor (e.g., a transceiver processor, or a radio processor, or a transmitter processor, or a receiver processor). The processor may be coupled with memory and execute instructions stored in the memory that enable the processor to perform or facilitate the features of the control signaling transmitter 1325, the uplink message receiver 1330, the configuration determination component 1335, and the uplink message decoder 1340 discussed herein.

Figure 14:
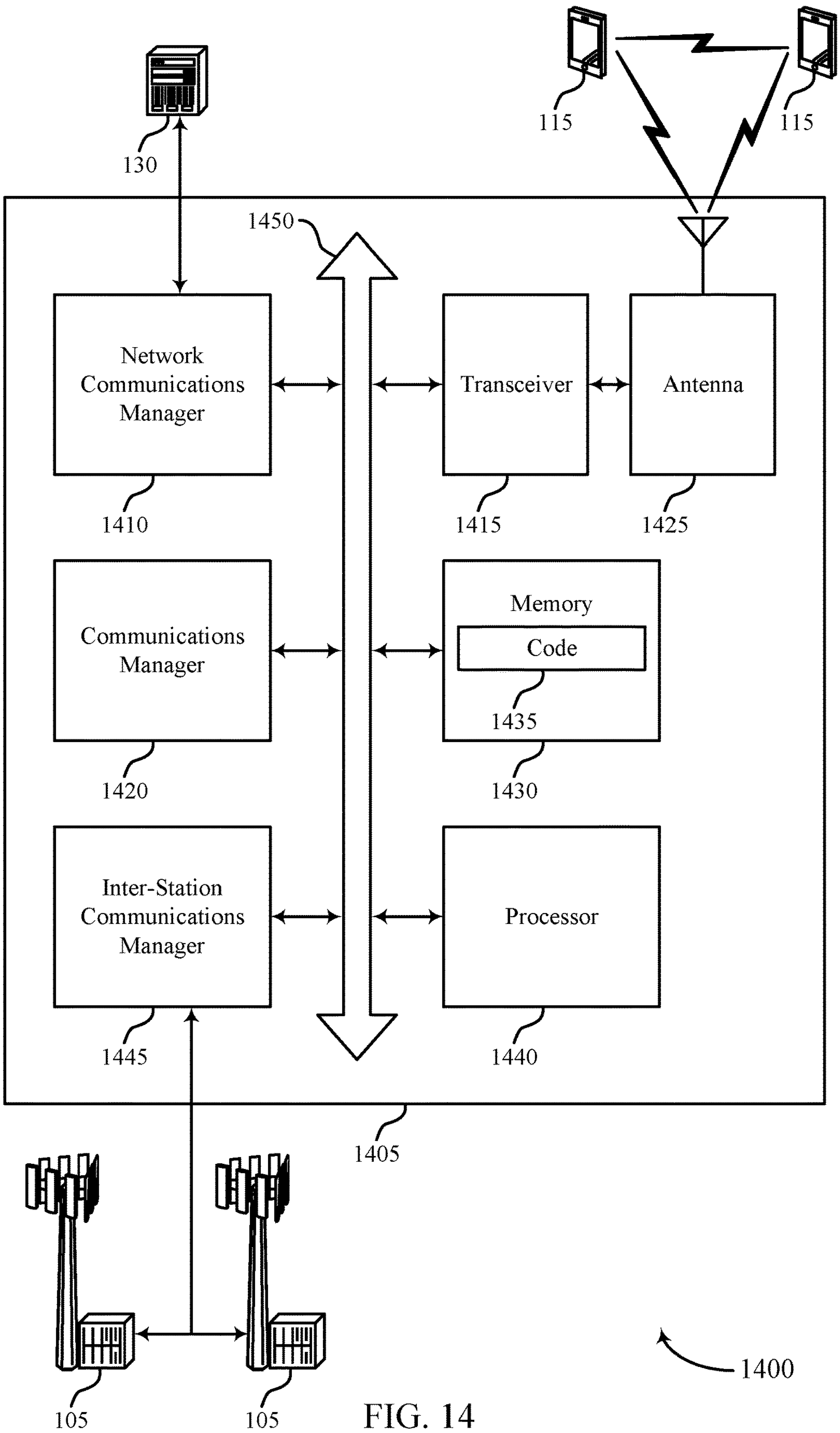
FIG. 14 shows a diagram of a system including a device that supports techniques for uplink transmission power splitting in accordance with aspects of the present disclosure.

FIG. 14 shows a diagram of a system 1400 including a device 1405 that supports techniques for uplink transmission power splitting in accordance with aspects of the present disclosure. The device 1405 may be an example of or include the components of a device 1105, a device 1205, or a network entity as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of at least a transmitter 1115, or a transmitter 1215, or a receiver 1110, or a receiver 1210, or a combination or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include at least an intelligent hardware device (e.g., a general-purpose processor, or a DSP, or a CPU, or a microcontroller, or an ASIC, or an FPGA, or a programmable logic device, or a discrete gate or transistor logic component, or a discrete hardware component, or a combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for uplink transmission power splitting). For example, the device 1405 or a component of the device 1405 may include a processor 1440 and memory 1430 coupled with or to the processor 1440, the processor 1440 and memory 1430 configured to perform various functions described herein.

The inter-station communications manager 1445 may manage communications with other network entities 105, and may include a controller or scheduler for controlling communications with UEs 115 in cooperation with other network entities 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between network entities 105.

The communications manager 1420 may support wireless communications at a network entity in accordance with examples as disclosed herein. For example, the communications manager 1420 may be configured as or otherwise support a means for transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The communications manager 1420 may be configured as or otherwise support a means for receiving one or more uplink messages from the UE in accordance with the uplink transmission power sharing configuration, where the one or more uplink messages are received at a first transmission power and at a second transmission power that is different from the first transmission power.

By including or configuring the communications manager 1420 in accordance with examples as described herein, the device 1405 may support techniques for configuring a UE with an unequal transmission power sharing configuration, which may enable the UE to attain relatively higher uplink transmission powers. Transmitting uplink messages with a relatively higher transmission power may improve the likelihood of the device 1405 successfully receiving the uplink messages, and may also enable the UE to attain relatively higher throughput levels.

In some examples, the communications manager 1420 may be configured to perform various operations (e.g., receiving, monitoring, transmitting) using or otherwise in cooperation with at least the transceiver 1415, or the one or more antennas 1425, or a combination thereof. Although the communications manager 1420 is illustrated as a separate component, in some examples, one or more functions described with reference to the communications manager 1420 may be supported by or performed by at least the processor 1440, or the memory 1430, or the code 1435, or a combination thereof. For example, the code 1435 may include instructions executable by the processor 1440 to cause the device 1405 to perform various aspects of techniques for uplink transmission power splitting as described herein, or the processor 1440 and the memory 1430 may be otherwise configured to perform or support such operations.

Figure 15:
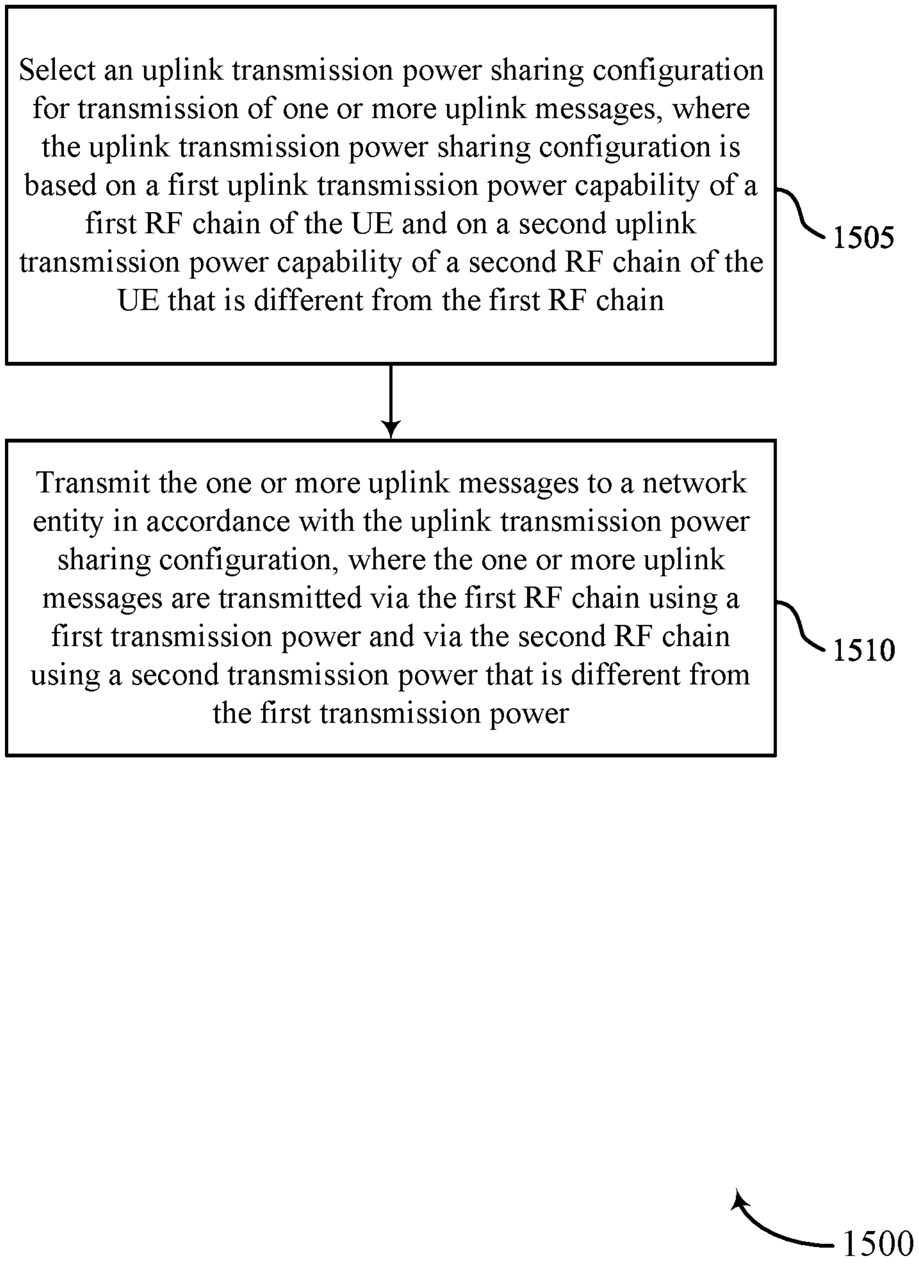
FIGS. 15 through 18 show flowcharts illustrating methods that support techniques for uplink transmission power splitting in accordance with aspects of the present disclosure.

FIG. 15 shows a flowchart illustrating a method 1500 that supports techniques for uplink transmission power splitting in accordance with aspects of the present disclosure. The operations of the method 1500 may be implemented by a UE or components of a UE as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include selecting an uplink transmission power sharing configuration for transmission of one or more uplink messages, where the uplink transmission power sharing configuration is based on a first uplink transmission power capability of a first RF chain of the UE and on a second uplink transmission power capability of a second RF chain of the UE that is different from the first RF chain. The operations of 1505 may be performed in accordance with examples as disclosed herein. In some examples, aspects of the operations of 1505 may be performed by a configuration selecting component 925 as described with reference to FIG. 9.

At 1510, the method may include transmitting the one or more uplink messages to a network entity in accordance with the uplink transmission power sharing configuration, where the one or more uplink messages are transmitted via the first RF chain using a first transmission power and via the second RF chain using a second transmission power that is different from the first transmission power. The operations of 1510 may be performed in accordance with examples as disclosed herein. In some examples, aspects of the operations of 1510 may be performed by an uplink message transmitter 930 as described with reference to FIG. 9.

Figure 16:
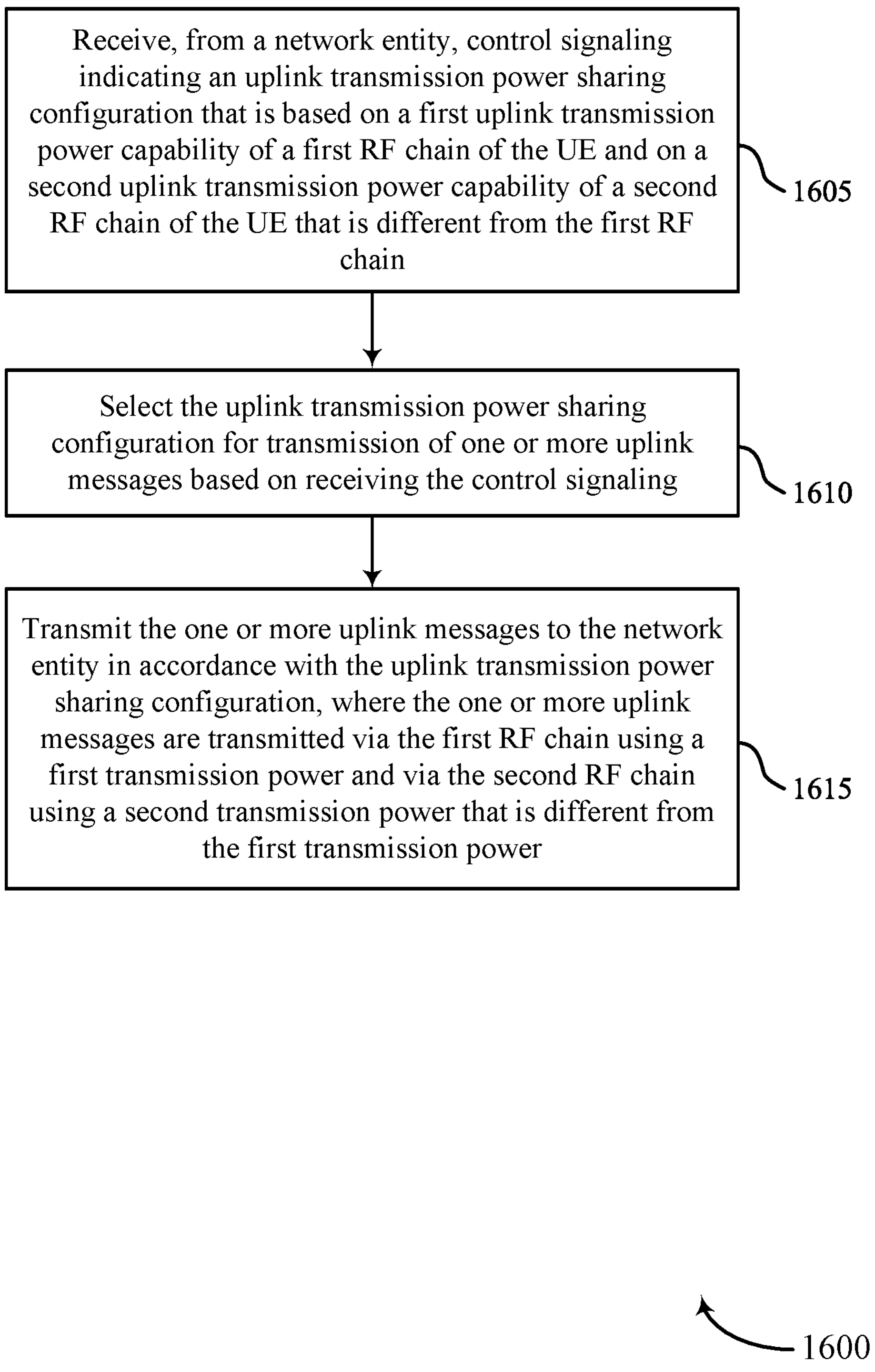

FIG. 16 shows a flowchart illustrating a method 1600 that supports techniques for uplink transmission power splitting in accordance with aspects of the present disclosure. The operations of the method 1600 may be implemented by a UE or components of a UE as described herein. For example, the operations of the method 1600 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1605, the method may include receiving, from a network entity, control signaling indicating an uplink transmission power sharing configuration that is based on a first uplink transmission power capability of a first RF chain of the UE and on a second uplink transmission power capability of a second RF chain of the UE that is different from the first RF chain. The operations of 1605 may be performed in accordance with examples as disclosed herein. In some examples, aspects of the operations of 1605 may be performed by a control signaling receiver 935 as described with reference to FIG. 9.

At 1610, the method may include selecting the uplink transmission power sharing configuration for transmission of one or more uplink messages based on receiving the control signaling. The operations of 1610 may be performed in accordance with examples as disclosed herein. In some examples, aspects of the operations of 1610 may be performed by a configuration selecting component 925 as described with reference to FIG. 9.

At 1615, the method may include transmitting the one or more uplink messages to the network entity in accordance with the uplink transmission power sharing configuration, where the one or more uplink messages are transmitted via the first RF chain using a first transmission power and via the second RF chain using a second transmission power that is different from the first transmission power. The operations of 1615 may be performed in accordance with examples as disclosed herein. In some examples, aspects of the operations of 1615 may be performed by an uplink message transmitter 930 as described with reference to FIG. 9.

Figure 17:
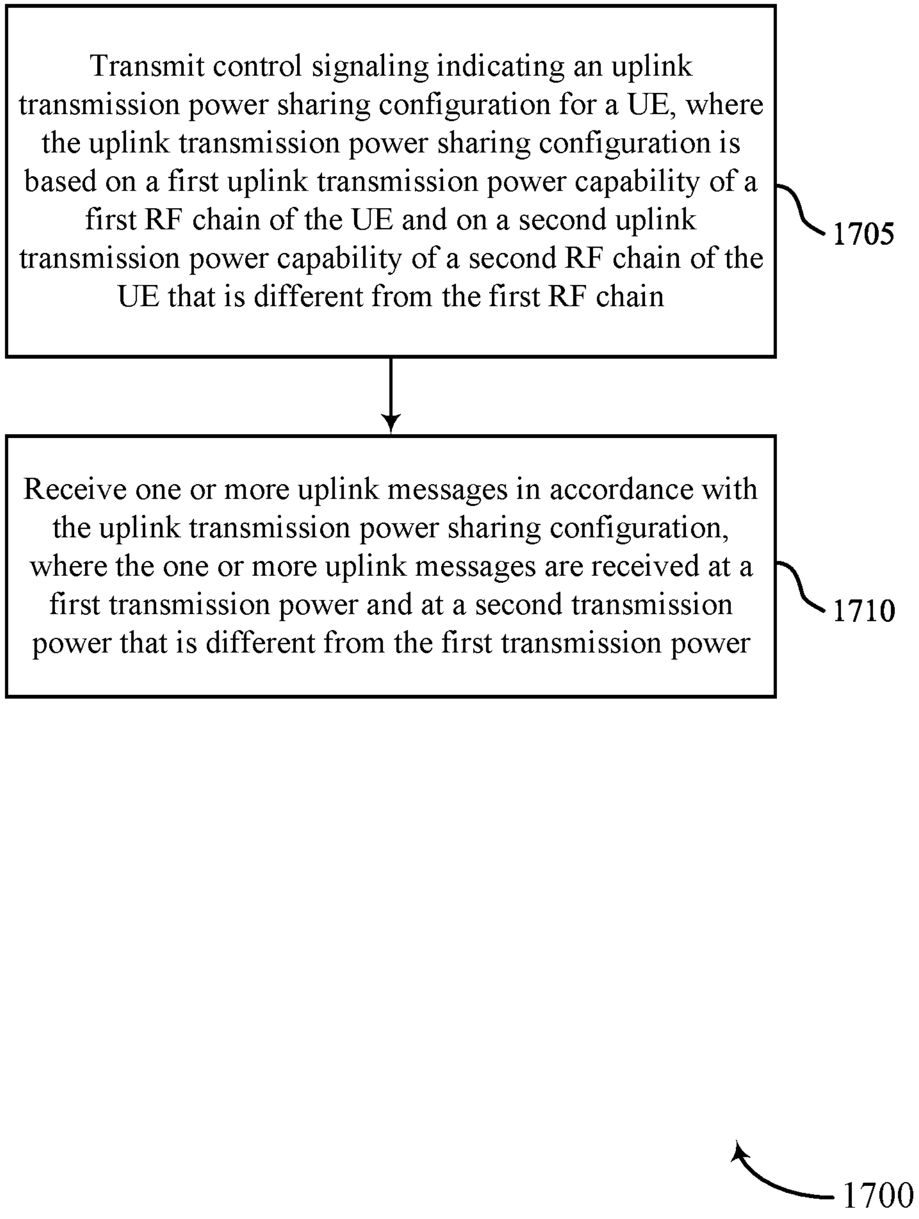

FIG. 17 shows a flowchart illustrating a method 1700 that supports techniques for uplink transmission power splitting in accordance with aspects of the present disclosure. The operations of the method 1700 may be implemented by a network entity or its components as described herein. For example, the operations of the method 1700 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1705, the method may include transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The operations of 1705 may be performed in accordance with examples as disclosed herein. In some examples, aspects of the operations of 1705 may be performed by a control signaling transmitter 1325 as described with reference to FIG. 13.

At 1710, the method may include receiving one or more uplink messages from the UE in accordance with the uplink transmission power sharing configuration, where the one or more uplink messages are received at a first transmission power and at a second transmission power that is different from the first transmission power. The operations of 1710 may be performed in accordance with examples as disclosed herein. In some examples, aspects of the operations of 1710 may be performed by an uplink message receiver 1330 as described with reference to FIG. 13.

Figure 18:
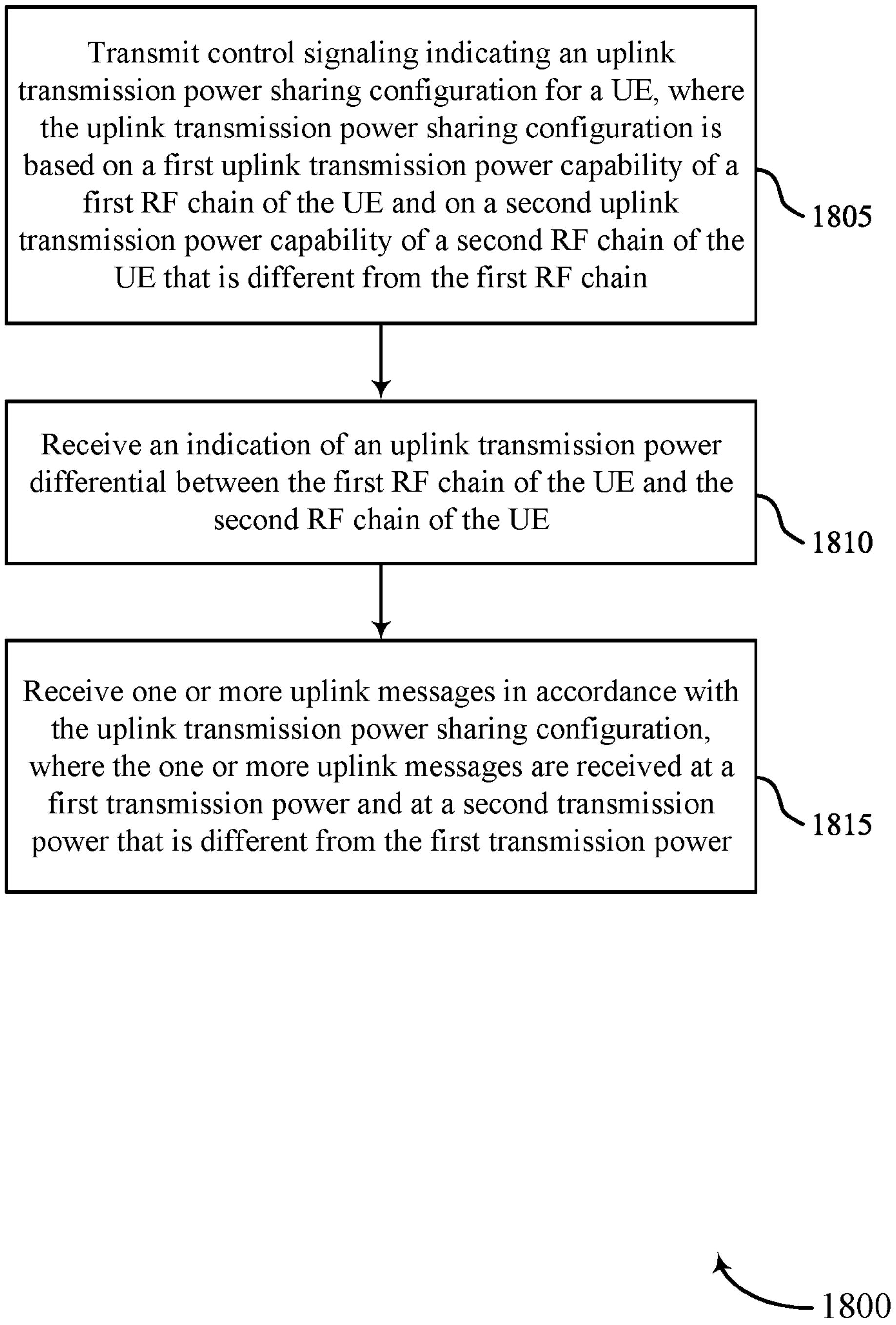

FIG. 18 shows a flowchart illustrating a method 1800 that supports techniques for uplink transmission power splitting in accordance with aspects of the present disclosure. The operations of the method 1800 may be implemented by a network entity or its components as described herein. For example, the operations of the method 1800 may be performed by a network entity as described with reference to FIGS. 1 through 6 and 11 through 14. In some examples, a network entity may execute a set of instructions to control the functional elements of the network entity to perform the described functions. Additionally, or alternatively, the network entity may perform aspects of the described functions using special-purpose hardware.

At 1805, the method may include transmitting control signaling indicating an uplink transmission power sharing configuration for a UE, where the uplink transmission power sharing configuration is based on a first uplink transmission power capability of a first RF chain of the UE and on a second uplink transmission power capability of a second RF chain of the UE that is different from the first RF chain. The operations of 1805 may be performed in accordance with examples as disclosed herein. In some examples, aspects of the operations of 1805 may be performed by a control signaling transmitter 1325 as described with reference to FIG. 13.

At 1810, the method may include receiving, from the UE, an indication of an uplink transmission power differential between the first RF chain of the UE and the second RF chain of the UE. The operations of 1810 may be performed in accordance with examples as disclosed herein. In some examples, aspects of the operations of 1810 may be performed by an uplink message receiver 1330 as described with reference to FIG. 13.

At 1815, the method may include receiving one or more uplink messages from the UE in accordance with the uplink transmission power sharing configuration, where the one or more uplink messages are received at a first transmission power and at a second transmission power that is different from the first transmission power. The operations of 1815 may be performed in accordance with examples as disclosed herein. In some examples, aspects of the operations of 1815 may be performed by an uplink message receiver 1330 as described with reference to FIG. 13.

The following provides an overview of aspects of the present disclosure:

Aspect 1: A method for wireless communications at a UE, comprising: selecting an uplink transmission power sharing configuration for transmission of one or more uplink messages, wherein the uplink transmission power sharing configuration is based at least in part on a first uplink transmission power capability of a first radio frequency chain of the UE and on a second uplink transmission power capability of a second radio frequency chain of the UE that is different from the first radio frequency chain; and transmitting the one or more uplink messages to a network entity in accordance with the uplink transmission power sharing configuration, wherein the one or more uplink messages are transmitted via the first radio frequency chain using a first transmission power and via the second radio frequency chain using a second transmission power that is different from the first transmission power.

Aspect 2: The method of aspect 1, further comprising: receiving, from the network entity, control signaling indicating the uplink transmission power sharing configuration, wherein selecting the uplink transmission power sharing configuration for transmission of the one or more uplink messages is based at least in part on the control signaling.

Aspect 3: The method of any of aspects 1 through 2, further comprising: determining to use the uplink transmission power sharing configuration for transmission of the one or more uplink messages based at least in part on a transmission power of the first radio frequency chain, or a transmission power of the second radio frequency chain, or both satisfying a transmission power threshold, wherein selecting the uplink transmission power sharing configuration is based at least in part on the determination.

Aspect 4: The method of aspect 3, further comprising: receiving control signaling indicating the transmission power threshold, wherein selecting the uplink transmission power sharing configuration for transmission of the one or more uplink messages is based at least in part on the control signaling.

Aspect 5: The method of any of aspects 3 through 4, wherein the transmission power comprises an average transmission power within a time interval or a requested transmission power for the one or more uplink messages.

Aspect 6: The method of any of aspects 3 through 5, wherein the transmission power threshold is based at least in part on the first uplink transmission power capability of the first radio frequency chain of the UE, or the second uplink transmission power capability of the second radio frequency chain of the UE, or a specific absorption rate threshold of the UE, or a maximum permissible exposure threshold of the UE, or a combination thereof.

Aspect 7: The method of any of aspects 3 through 6, further comprising: determining the transmission power threshold based at least in part on a result of a proximity detection procedure, or a physical uplink shared channel power control equation, or both.

Aspect 8: The method of any of aspects 1 through 7, further comprising: determining to use a default uplink transmission power sharing configuration for transmission of the one or more uplink messages based at least in part on comparing a transmission power of the first radio frequency chain, or a transmission power of the second radio frequency chain, or both to a transmission power threshold.

Aspect 9: The method of any of aspects 1 through 2, wherein transmitting the one or more uplink messages comprises: transmitting the one or more uplink messages to the network entity based at least in part on an uplink transmission power differential between the first radio frequency chain of the UE and the second radio frequency chain of the UE.

Aspect 10: The method of aspect 9, further comprising: transmitting, to the network entity, an indication of the uplink transmission power differential between the first radio frequency chain of the UE and the second radio frequency chain of the UE.

Aspect 11: The method of any of aspects 9 through 10, further comprising: receiving, from the network entity, an indication of the uplink transmission power differential between the first radio frequency chain of the UE and the second radio frequency chain of the UE.

Aspect 12: The method of any of aspects 9 through 11, further comprising: receiving, from the network entity, an indication of whether the uplink transmission power differential is applicable to sounding reference signal transmissions from the UE, or physical uplink shared channel transmissions from the UE, or both.

Aspect 13: The method of any of aspects 9 through 12, further comprising: receiving control signaling configuring a single-port resource for transmission of the one or more uplink messages; and selecting a transmission precoding matrix based at least in part on the uplink transmission power differential, the transmission precoding matrix comprising a first value associated with a full transmission power for the first radio frequency chain and a second value that is less than the first value, the second value associated with a transmission power for the second radio frequency chain, wherein the one or more uplink messages are transmitted using the single-port resource and the transmission precoding matrix.

Aspect 14: The method of aspect 13, further comprising: receiving, from the network entity, a control message indicating the first value associated with the full transmission power for the first radio frequency chain, or the second value associated with the transmission power for the second radio frequency chain, or both.

Aspect 15: The method of any of aspects 9 through 14, further comprising: receiving control signaling configuring a set of resources for the one or more uplink messages; and sounding two or more ports using the set of resources based at least in part on the uplink transmission power differential.

Aspect 16: The method of any of aspects 1 through 15, further comprising: determining, based at least in part on the uplink transmission power sharing configuration, a transmission precoding matrix to use for transmission of the one or more uplink messages.

Aspect 17: The method of any of aspects 1 through 16, further comprising: transmitting, to the network entity, a power headroom report indicating the uplink transmission power sharing configuration selected by the UE.

Aspect 18: The method of any of aspects 1 through 17, further comprising: transmitting, to the network entity, uplink control information indicating the uplink transmission power sharing configuration selected by the UE.

Aspect 19: The method of any of aspects 1 through 18, wherein transmitting the one or more uplink messages comprises: transmitting, via the first radio frequency chain, the one or more uplink messages in a first radio frequency spectrum band; and transmitting, via the second radio frequency chain, the one or more uplink messages in a second radio frequency spectrum band that is different from the first radio frequency spectrum band.

Aspect 20: The method of any of aspects 1 through 19, wherein the one or more uplink messages comprise physical uplink shared channel transmissions, or sounding reference signal transmissions, or both.

Aspect 21: A method for wireless communications at a network entity, comprising: transmitting control signaling indicating an uplink transmission power sharing configuration for a UE, wherein the uplink transmission power sharing configuration is based at least in part on a first uplink transmission power capability of a first radio frequency chain of the UE and on a second uplink transmission power capability of a second radio frequency chain of the UE that is different from the first radio frequency chain; and receiving one or more uplink messages from the UE in accordance with the uplink transmission power sharing configuration, wherein the one or more uplink messages are received at a first transmission power and at a second transmission power that is different from the first transmission power.

Aspect 22: The method of aspect 21, wherein transmitting the control signaling comprises: transmitting the control signaling indicating the uplink transmission power sharing configuration, or a transmission power threshold associated with the uplink transmission power sharing configuration, or both, wherein receiving the one or more uplink messages from the UE is based at least in part on the control signaling.

Aspect 23: The method of aspect 22, wherein the transmission power threshold is based at least in part on the first uplink transmission power capability of the first radio frequency chain of the UE, or the second uplink transmission power capability of the second radio frequency chain of the UE, or a specific absorption rate threshold of the UE, or a maximum permissible exposure threshold of the UE, or a combination thereof.

Aspect 24: The method of any of aspects 21 through 23, further comprising: receiving an indication of an uplink transmission power differential between the first radio frequency chain of the UE and the second radio frequency chain of the UE.

Aspect 25: The method of aspect 24, further comprising: transmitting an indication of whether the uplink transmission power differential is applicable to sounding reference signal transmissions, or physical uplink shared channel transmissions, or both.

Aspect 26: The method of any of aspects 24 through 25, further comprising: transmitting control signaling configuring a single-port resource for transmission of the one or more uplink messages; determining a transmission precoding matrix of the UE based at least in part on the uplink transmission power differential and on the single-port resource, the transmission precoding matrix comprising a first value associated with a full transmission power for the first radio frequency chain of the UE and a second value that is less than the first value, the second value associated with a transmission power for the second radio frequency chain of the UE; and decoding the one or more uplink messages using the transmission precoding matrix.

Aspect 27: The method of any of aspects 24 through 26, further comprising: transmitting control signaling configuring a set of resources for transmission of one or more sounding reference signals; and receiving the one or more sounding reference signals on the set of resources and based at least in part on the uplink transmission power differential.

Aspect 28: The method of any of aspects 21 through 27, further comprising: receiving a power headroom report, or uplink control information, or both; and determining that the UE is using the uplink transmission power sharing configuration based at least in part on the power headroom report, or the uplink control information, or both.

Aspect 29: An apparatus for wireless communications at a UE, comprising a processor; memory coupled with the processor; and instructions stored in the memory and executable by the processor to cause the apparatus to perform a method of any of aspects 1 through 20.

Aspect 30: An apparatus for wireless communications at a UE, comprising at least one means for performing a method of any of aspects 1 through 20.

Aspect 31: A non-transitory computer-readable medium storing code for wireless communications at a UE, the code comprising instructions executable by a processor to perform a method of any of aspects 1 through 20.

Aspect 32: An apparatus for wireless communications at a network entity, comprising a processor; memory coupled with the processor; and instructions stored in the memory and executable by the processor to cause the apparatus to perform a method of any of aspects 21 through 28.

Aspect 33: An apparatus for wireless communications at a network entity, comprising at least one means for performing a method of any of aspects 21 through 28.

Aspect 34: A non-transitory computer-readable medium storing code for wireless communications at a network entity, the code comprising instructions executable by a processor to perform a method of any of aspects 21 through 28.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by at least voltages, or currents, or electromagnetic waves, or magnetic fields or particles, or optical fields or particles, or a combination thereof.

The various illustrative blocks and components described in connection with the disclosure herein may be implemented or performed with at least a general-purpose processor, or a DSP, or an ASIC, or a CPU, or an FPGA or other programmable logic device, or a discrete gate or transistor logic, or discrete hardware components, or a combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in at least hardware, or software executed by a processor, or firmware, or a combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

selecting an uplink transmission power sharing configuration for transmission of one or more uplink messages, wherein the uplink transmission power sharing configuration is based at least in part on a first uplink transmission power capability of a first radio frequency chain of the UE and on a second uplink transmission power capability of a second radio frequency chain of the UE that is different from the first radio frequency chain; and transmitting the one or more uplink messages to a network entity in accordance with the uplink transmission power sharing configuration, wherein the one or more uplink messages are transmitted via the first radio frequency chain using a first transmission power and via the second radio frequency chain using a second transmission power that is different from the first transmission power.

2. The method of claim 1, further comprising:

receiving, from the network entity, control signaling indicating the uplink transmission power sharing configuration, wherein selecting the uplink transmission power sharing configuration for transmission of the one or more uplink messages is based at least in part on the control signaling.

3. The method of claim 1, further comprising:

determining to use the uplink transmission power sharing configuration for transmission of the one or more uplink messages based at least in part on a transmission power of the first radio frequency chain, or a transmission power of the second radio frequency chain, or both satisfying a transmission power threshold, wherein selecting the uplink transmission power sharing configuration is based at least in part on the determination.

4. The method of claim 3, further comprising:

receiving control signaling indicating the transmission power threshold, wherein selecting the uplink transmission power sharing configuration for transmission of the one or more uplink messages is based at least in part on the control signaling.

5. The method of claim 3, wherein the transmission power comprises an average transmission power within a time interval or a requested transmission power for the one or more uplink messages.

6. The method of claim 3, wherein the transmission power threshold is based at least in part on the first uplink transmission power capability of the first radio frequency chain of the UE, or the second uplink transmission power capability of the second radio frequency chain of the UE, or a specific absorption rate threshold of the UE, or a maximum permissible exposure threshold of the UE, or a combination thereof.

7. The method of claim 3, further comprising:

determining the transmission power threshold based at least in part on a result of a proximity detection procedure, or a physical uplink shared channel power control equation, or both.

8. The method of claim 1, further comprising:

determining to use a default uplink transmission power sharing configuration for transmission of the one or more uplink messages based at least in part on comparing a transmission power of the first radio frequency chain, or a transmission power of the second radio frequency chain, or both to a transmission power threshold.

9. The method of claim 1, wherein transmitting the one or more uplink messages comprises:

transmitting the one or more uplink messages to the network entity based at least in part on an uplink transmission power differential between the first radio frequency chain of the UE and the second radio frequency chain of the UE.

10. The method of claim 9, further comprising:

transmitting, to the network entity, an indication of the uplink transmission power differential between the first radio frequency chain of the UE and the second radio frequency chain of the UE.

11. The method of claim 9, further comprising:

receiving, from the network entity, an indication of the uplink transmission power differential between the first radio frequency chain of the UE and the second radio frequency chain of the UE.

12. The method of claim 9, further comprising:

receiving, from the network entity, an indication of whether the uplink transmission power differential is applicable to sounding reference signal transmissions from the UE, or physical uplink shared channel transmissions from the UE, or both.

13. The method of claim 9, further comprising:

receiving control signaling configuring a single-port resource for transmission of the one or more uplink messages; and selecting a transmission precoding matrix based at least in part on the uplink transmission power differential, the transmission precoding matrix comprising a first value associated with a full transmission power for the first radio frequency chain and a second value that is less than the first value, the second value associated with a transmission power for the second radio frequency chain, wherein the one or more uplink messages are transmitted using the single-port resource and the transmission precoding matrix.

14. The method of claim 13, further comprising:

receiving, from the network entity, a control message indicating the first value associated with the full transmission power for the first radio frequency chain, or the second value associated with the transmission power for the second radio frequency chain, or both.

15. The method of claim 9, further comprising:

receiving control signaling configuring a set of resources for the one or more uplink messages; and sounding two or more ports using the set of resources based at least in part on the uplink transmission power differential.

16. The method of claim 1, further comprising:

determining, based at least in part on the uplink transmission power sharing configuration, a transmission precoding matrix to use for transmission of the one or more uplink messages.

17. The method of claim 1, further comprising:

transmitting, to the network entity, a power headroom report indicating the uplink transmission power sharing configuration selected by the UE.

18. The method of claim 1, further comprising:

transmitting, to the network entity, uplink control information indicating the uplink transmission power sharing configuration selected by the UE.

19. The method of claim 1, wherein transmitting the one or more uplink messages comprises:

transmitting, via the first radio frequency chain, the one or more uplink messages in a first radio frequency spectrum band; and transmitting, via the second radio frequency chain, the one or more uplink messages in a second radio frequency spectrum band that is different from the first radio frequency spectrum band.

20. The method of claim 1, wherein the one or more uplink messages comprise physical uplink shared channel transmissions, or sounding reference signal transmissions, or both.

21. An apparatus for wireless communications at a user equipment (UE), comprising:

a processor;

memory coupled with the processor; and instructions stored in the memory and executable by the processor to cause the apparatus to:

select an uplink transmission power sharing configuration for transmission of one or more uplink messages, wherein the uplink transmission power sharing configuration is based at least in part on a first uplink transmission power capability of a first radio frequency chain of the UE and on a second uplink transmission power capability of a second radio frequency chain of the UE that is different from the first radio frequency chain; and transmit the one or more uplink messages to a network entity in accordance with the uplink transmission power sharing configuration, wherein the one or more uplink messages are transmitted via the first radio frequency chain using a first transmission power and via the second radio frequency chain using a second transmission power that is different from the first transmission power.

* * * * *